(12) United States Patent
Maehara et al.

(10) Patent No.: US 7,210,454 B2
(45) Date of Patent: May 1, 2007

(54) INTERNAL COMBUSTION ENGINE CAPABLE OF SELECTIVELY RESTING CERTAIN CYLINDERS DURING LOW-LOAD OPERATION, AND METHOD OF USING SAME

(75) Inventors: Hayato Maehara, Saitama (JP); Shinji Saito, Saitama (JP); Kazuhito Hotta, Saitama (JP); Takaaki Tsukui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/220,859

(22) Filed: Sep. 7, 2005

(65) Prior Publication Data

US 2006/0048746 A1 Mar. 9, 2006

(30) Foreign Application Priority Data

Sep. 7, 2004 (JP) ............................. 2004-259614

(51) Int. Cl.
*F02D 9/08* (2006.01)
*F02M 7/00* (2006.01)
(52) U.S. Cl. ...................................... 123/403; 123/344
(58) Field of Classification Search ................ 123/403, 123/344, 360, 361, 399, 402
See application file for complete search history.

(56) References Cited

U.S. PATENT DOCUMENTS

| | | | | |
|---|---|---|---|---|
| 4,019,479 A | * | 4/1977 | Garabedian | 123/198 F |
| 4,109,634 A | * | 8/1978 | Garabedian | 123/198 F |
| 4,545,331 A | * | 10/1985 | Ito et al. | 123/26 |
| 4,582,033 A | * | 4/1986 | Sorg et al. | 123/478 |
| 4,781,027 A | * | 11/1988 | Richter et al. | 60/602 |
| 4,793,294 A | * | 12/1988 | Wada | 123/184.55 |
| 4,856,477 A | | 8/1989 | Hanaoka et al. | |
| 4,881,428 A | | 11/1989 | Ishikawa et al. | |
| 5,189,621 A | | 2/1993 | Onari et al. | |
| 5,361,734 A | | 11/1994 | Shirai | |
| 5,758,612 A | | 6/1998 | Tsuzuku et al. | |
| 6,647,947 B2 | * | 11/2003 | Boyer et al. | 123/198 F |

FOREIGN PATENT DOCUMENTS

| | | |
|---|---|---|
| EP | 1 462 622 | 9/2004 |
| EP | 1 462 644 | 9/2004 |
| JP | 58 035244 | 1/1983 |
| JP | 60 228737 | 11/1986 |
| JP | 07-150982 | 6/1995 |

* cited by examiner

*Primary Examiner*—John T. Kwon
(74) *Attorney, Agent, or Firm*—Carrier, Blackman & Associates, P.C.; William D. Blackman; Joseph P. Carrier

(57) ABSTRACT

An internal combustion engine having cylinders capable of selectively resting during engine operation is capable of eliminating step increases in engine output when the number of operative cylinders is changed. The internal combustion engine includes a plurality of cylinders divided into two or more groups, at least some of the cylinders being restable. A throttle valve of each of the cylinders is independently operable on the basis of the group to which the cylinder belongs, and the number of resting cylinders is controlled according to the throttle grip opening. The throttle valve opening is different between the groups, except for the full opening condition and the full closure condition of the throttle valve, and an ECU is provided for opening the throttle valve of the next cylinder group before the throttle valve opening of the former cylinder group reaches the full opening condition.

11 Claims, 15 Drawing Sheets

CHANGEOVER CONTROL (OPERATION → REST)

S1: GRIP OPENING $\theta g$

S2: FI STOP

S3: VALVE REST

S4: THROTTLE VALVE → CLOSED

S5: IGNITION CUTOFF RESET

AFTER 10 CYCLES.

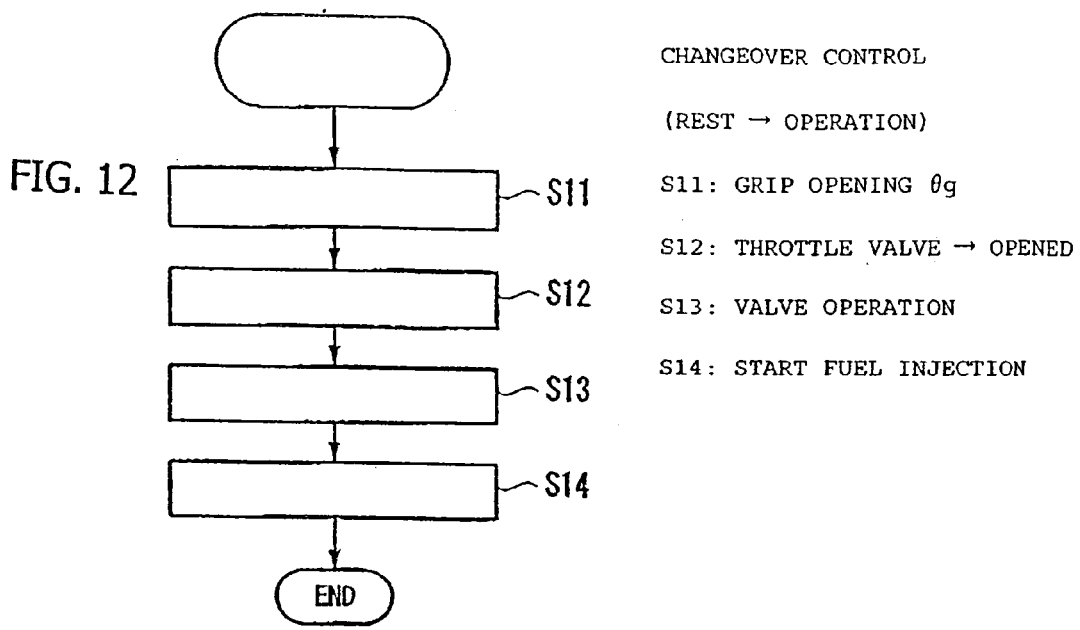
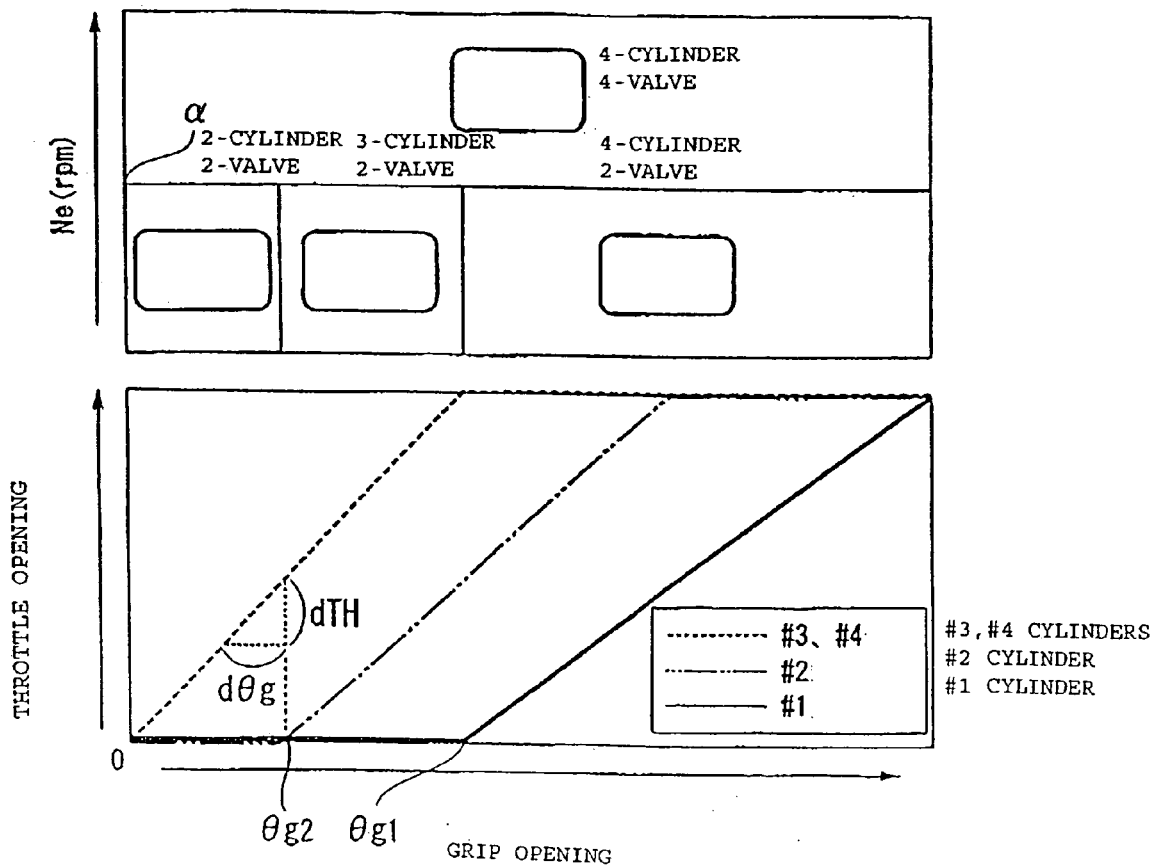

INTERNAL COMBUSTION ENGINE CAPABLE OF SELECTIVELY RESTING CERTAIN CYLINDERS DURING LOW-LOAD OPERATION, AND METHOD OF USING SAME

CROSS-REFERENCE TO RELATED APPLICATIONS

The present invention claims priority under 35 USC 119 based on Japanese patent application No. 2004-259614, filed on Sep. 7, 2004. The subject matter of this priority document is incorporated by reference herein.

BACKGROUND OF THE INVENTION

1. Field of the Invention

The present invention relates to a multi-cylinder internal combustion engine, in which at least some of a plurality of cylinders are capable of selectively resting during engine operation under low load.

2. Description of the Background Art

Among multiple-cylinder internal combustion engines, an engine is known in which some of the cylinders selectively rest, or become non-operative, during normal engine operation under certain low-load conditions. In such an engine, a plurality of cylinders are divided into at least two groups. The throttle valve opening of a second (or other) group is set smaller than that of a first group in a low load range, where the throttle valve opening of the first group is less than a predetermined value. A throttle valve control means is provided for ensuring that, when the throttle valve opening of the first group has reached the predetermined value, the throttle valve opening of the second group is thereafter increased at a ratio larger than that for the throttle valve opening of the first group. When the throttle valve opening of the second group coincides with the throttle valve opening of the first group, the throttle valve openings of the first and second groups are thereafter varied at the same rate. Such an engine is disclosed, for example, in Japanese Patent Laid-open No. Hei 07-150982.

In Japanese Patent Laid-open No. Hei 07-150982, the irregular combustion in a 2-cycle engine can be suppressed by the throttle valve control. However, since the cylinders in the second group, which have been at rest, are operated when the throttle valve opening in the first group reaches a predetermined value, a step in engine output is generated at the time of operating the cylinders in the second group.

Accordingly, it is an object of the present invention to provide an internal combustion engine, in which at least some of a plurality of cylinders are capable of selectively resting during engine operation and which can eliminate engine output variations at the time of transition in the number of operable cylinders.

SUMMARY OF THE INVENTION

In order to attain the above object, a first aspect of the invention resides in an internal combustion engine incorporating a cylinder rest procedure in which one or more of a plurality of cylinders are selectively permitted to rest, or become non-operative, during operation of the engine. The plurality of cylinders is divided into two or more groups, and at least some of the cylinders are able to become non-operative through a cylinder resting mechanism (for example, the valve resting mechanism 63 and the valve resting mechanism 69 in the embodiment). Each cylinder includes a throttle valve (for example, the throttle valve TH in the embodiment) independently operable on the basis of the group to which the cylinder belongs. The number of resting cylinders is controlled according to a throttle operation variable (for example, the grip opening θg in the embodiment) set by the driver. The invention is characterized in that the throttle valve opening is different between the groups, except for the fully opened time and the fully closed time of the throttle valve. In addition, a throttle valve control unit (for example, the ECU 70 in the embodiment) can open the throttle valve in the next cylinder group before the throttle valve opening of the previous cylinder group is brought to a fully opened state.

With such a configuration, the throttle valve of the next cylinder group is opened before the throttle valve opening of the former cylinder group reaches a fully opened state. By this means, the internal combustion engine is operated with improved combustion efficiency, as compared to the case where the output is increased by simultaneously opening the throttle valves of all the cylinder groups. Among other advantages, the invention eliminates steps in engine output, since the throttle valve of the next cylinder group is opened before the throttle valve opening of the former cylinder group is fully opened.

A second aspect of the invention is characterized in that the plurality of cylinders include normally operative cylinders (for example, the #4 cylinder and the #3 cylinder in the embodiment) and cylinders capable of becoming non-operative, or rest-able (for example, the #2 cylinder and the #1 cylinder in the embodiment), and the amount of opening at the start of opening of the throttle valve in the rest-able cylinder is set to a predetermined amount of opening.

With such a configuration, it is possible to suppress the lowering in engine output due to the pumping loss generated at the time of opening a fully closed throttle valve when operation of a resting cylinder is initiated.

A third aspect of the invention is characterized in that the throttle valve opening set for each of the cylinder groups is set so that the increase ratio (for example, the increase ratio comprising dTH/dθg in the embodiment) is gradually enlarged according to the throttle operation variable in the vicinity of the full closure of the throttle valve. In addition, the increase ratio is gradually reduced according to the throttle operation variable in the vicinity of the full opening of the throttle valve.

With such a configuration, by a method in which the increase ratio of the throttle valve opening is gradually reduced in the vicinity of the full opening of the throttle valve of the former cylinder group, and the increase ratio of the throttle valve opening is enlarged at the start of opening of the throttle valve of the next cylinder group, the process in which the throttle valve opening of the former group is gradually brought to the fully opened state can be compensated for by the rise at the start of opening of the throttle valve of the next cylinder group.

A fourth aspect of the invention is characterized in that, in each of the cylinder groups, the average of the increase ratio of the throttle valve opening to the throttle operation variable in each of the cylinder groups is set higher for the cylinder group whose throttle valve is opened first upon the start of throttle operation. In addition, the average is set to be gradually lower for the cylinder groups whose throttle valves are thereafter opened sequentially.

With such a configuration, by bringing the throttle valve opening to the full opening early in a low load range of the engine, it is possible to operate with the load factor in a higher range. In addition, it is possible to reduce the pumping loss.

A fifth aspect of the invention is characterized in that a variable valve number control mechanism (for example, mainly, the oil pressure control valves 113A, 113B, 113C in the embodiment) is provided for each of the cylinders, and a specified valve or valves are rested at a low load time.

With such a configuration, by reducing the number of operative valves for limiting the intake air quantity at a low load time, it is possible to enhance the flow rate of the intake air. In addition, by resting the specified valve or valves, it is possible to generate an intake air flow swirl pattern within a cylinder.

A sixth aspect of the invention is characterized in that, when changing over the number of operative valves as controlled by the variable valve number control mechanism, the throttle valve opening is increased before the engine speed reaches a predetermined threshold, the predetermined threshold set as a valve changeover number (for example, the threshold value α of engine speed in the embodiment).

With such a configuration, it is possible to suppress the torque variations at the time of a changeover of the number of operative valves, and to achieve an engine output which is linear.

A seventh aspect of the invention is characterized in that the increase ratio of the throttle valve opening to the throttle operation variable is increased from the full closure of the throttle valve to the full opening of the throttle valve.

With such a configuration, by increasing the ratio of the throttle valve opening to the throttle operation variable from full closure to fully opened, it is possible to eliminate or suppress the sense of incompatibility generated by the saturation of the output characteristic, even upon an increase in the throttle operation variable. It is also possible to make the variation in output characteristic linear with the throttle operation variable.

According to the first aspect of the invention, the throttle valve of the next cylinder group is opened before the throttle valve opening of the former cylinder group reaches the full opening. Consequently, the internal combustion engine can be operated with improved combustion efficiency, with the result of an improvement in fuel consumption, as compared with the case where the output is increased by simultaneously opening the throttle valves of all the cylinder groups. Among other advantages, since the throttle valve of the next cylinder group is opened before the throttle valve opening of the former cylinder group reaches the full opening, it is possible to eliminates the step increases in engine output, and therefore to realize a smooth operation.

According to the second aspect of the invention, it is possible to suppress the lowering in engine output due to the pumping loss which would be generated at the time of opening a fully closed throttle valve in operating a resting cylinder. As a result, it is possible to eliminate a drop in engine output at the time of initiation of operation of a resting cylinder, and to secure a smooth increase in engine output.

According to the third aspect of the invention, the increase ratio of the throttle valve opening is gradually reduced in the vicinity of the full opening of the throttle valve of the former cylinder group, and the increase ratio of the throttle valve opening is enlarged at the start of opening of the throttle valve of the next cylinder group. Thus, the process in which the throttle valve opening of the former cylinder group is gradually brought to the fully opened state can be compensated for by the increase at the start of opening of the throttle valve of the next cylinder group. Therefore, it is possible to reduce the output variation at the start of operation of the next cylinder group, to obtain an enhanced sense of power, and to enhance the drivability.

According to the fourth aspect of the invention, by bringing early the throttle valve opening to the full opening in a low load range, it is possible to operate the engine with the load factor in a higher range, to reduce the pumping loss, and thereby to obtain an improvement in fuel consumption.

According to the fifth aspect of the invention, by reducing the number of operative valves for limiting the intake air quantity at a low load time, it is possible to enhance the flow rate of the intake air, and thereby to enhance the combustion efficiency. In addition, an intake air swirl flow pattern can be generated by resting a specified valve or valves, so that it is possible to further enhance the combustion efficiency.

According to the sixth aspect of the invention, it is possible to suppress the torque variation at the time of changeover of the number of operational valves, to make the output characteristic linear, and to enhance the drivability.

According to the seventh aspect of the invention, by increasing the ratio of the throttle valve opening to the throttle valve variable from the full closure to the full opening, it is possible to eliminate or reduce the sense of incompatibility generated due to saturation of the output characteristic, notwithstanding an increase in the throttle operation variable. It is also possible to make the variation in output characteristic linear with the throttle operation variable, so that the drivability is enhanced.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 12 is a flow chart showing the process of changeover, or transitioning, from valve rest to valve operation.

FIG. 13 is a graph diagram showing the relationships of throttle valve opening and engine speed with respect to handgrip opening.

DETAILED DESCRIPTION

Figure 1:
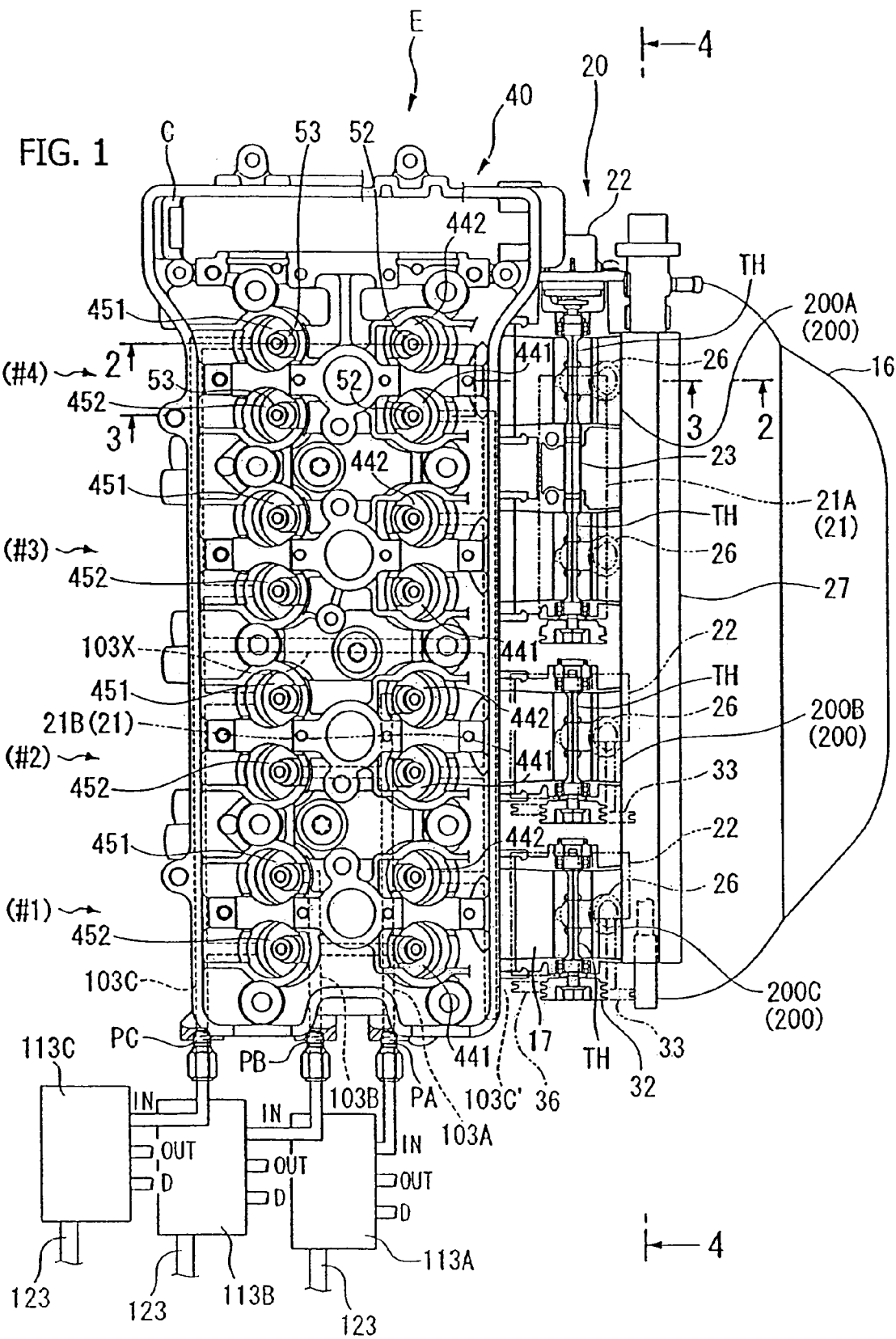
FIG. 1 is a top plan view of a major part of a four cylinder engine of one embodiment of the present invention, showing a cam chain case disposed at one end of the cylinder block, and oil pressure control valves disposed at the opposed end of the cylinder block.
Figure 2:
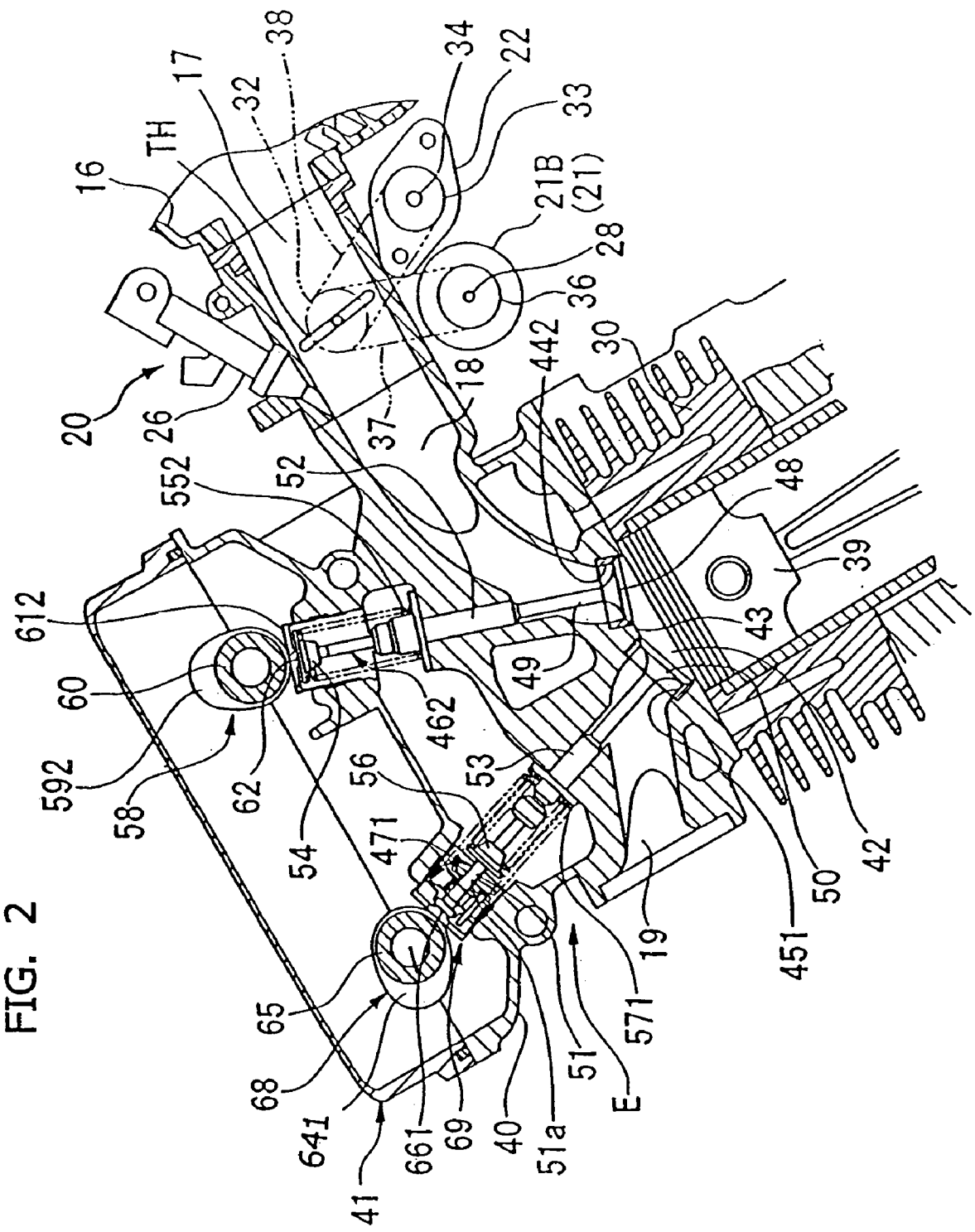
FIG. 2 is a sectional view of the engine along line 2–2 of FIG. 1 showing the number four cylinder of the engine in which a first exhaust valve includes a valve stop mechanism, and a second intake valve is formed conventionally.
Figure 3:
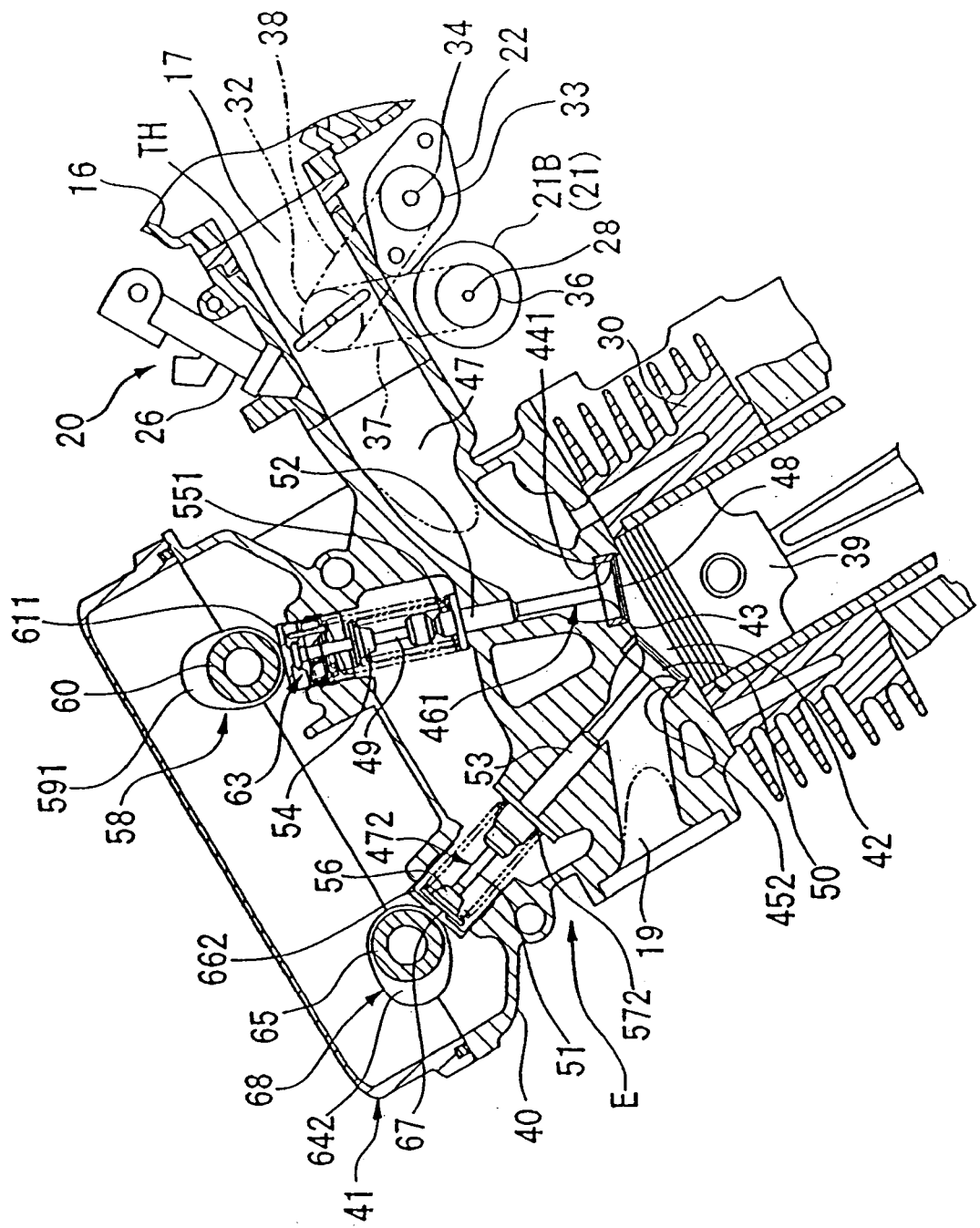
FIG. 3 is a sectional view of the engine along line 3–3 of FIG. 1 showing the number four cylinder of the engine in which a second exhaust valve is formed conventionally, and a first intake valve includes a valve stop mechanism.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. As shown in FIGS. 1 to 3, an engine E, according to the selected illustrative embodiment hereof, is a water-cooled, 4-cylinder motorcycle engine, for example. In the engine E, a cylinder head 40 is fixed on the top face of a cylinder block 30, and a head cover 41 is mounted to the top face of the cylinder head 40.

A cam chain case C is formed at a side portion of the engine E. A number one (the #1) cylinder, a number two (the #2) cylinder, a number three (the #3) cylinder and a number four (the #4) cylinder are arranged along the vehicle width direction, starting from the side of the engine opposite the cam chain case C. Each of these cylinders is provided with four valves, including two intake valves and two exhaust valves, which will be described later.

As shown in FIGS. 2 and 3, a throttle body 20 is connected to the cylinder head 40 so as to be oriented substantially horizontally. An intake air duct 16 is connected to the throttle body 20 on the upstream side thereof. During engine operation, intake air passes through an intake passage 17 formed in the throttle body, and is subsequently introduced to each cylinder via an intake port 18 formed in the cylinder head 40.

A butterfly-type throttle valve TH is provided in the intake passage 17 of the throttle body 20. The throttle valve TH is adjustably movable through a range extending between a fully opened position and a fully closed position. The throttle valve TH is operated by a so-called drive-by-wire or electronic throttle control system, in which the throttle valve TH is opened and closed in conjunction with a motor 21 according to an angular handgrip opening (throttle operation variable) θg, i.e., the amount of operation of the throttle handgrip by the driver, indicating the driver's intention toward acceleration or the like. In addition, a throttle valve position sensor (throttle valve control mechanism) 22 for detecting the throttle valve opening is connected to the throttle valve TH, so that the accurate turn angle of the throttle valve TH turned by the motor 21 can be detected.

Figure 4:
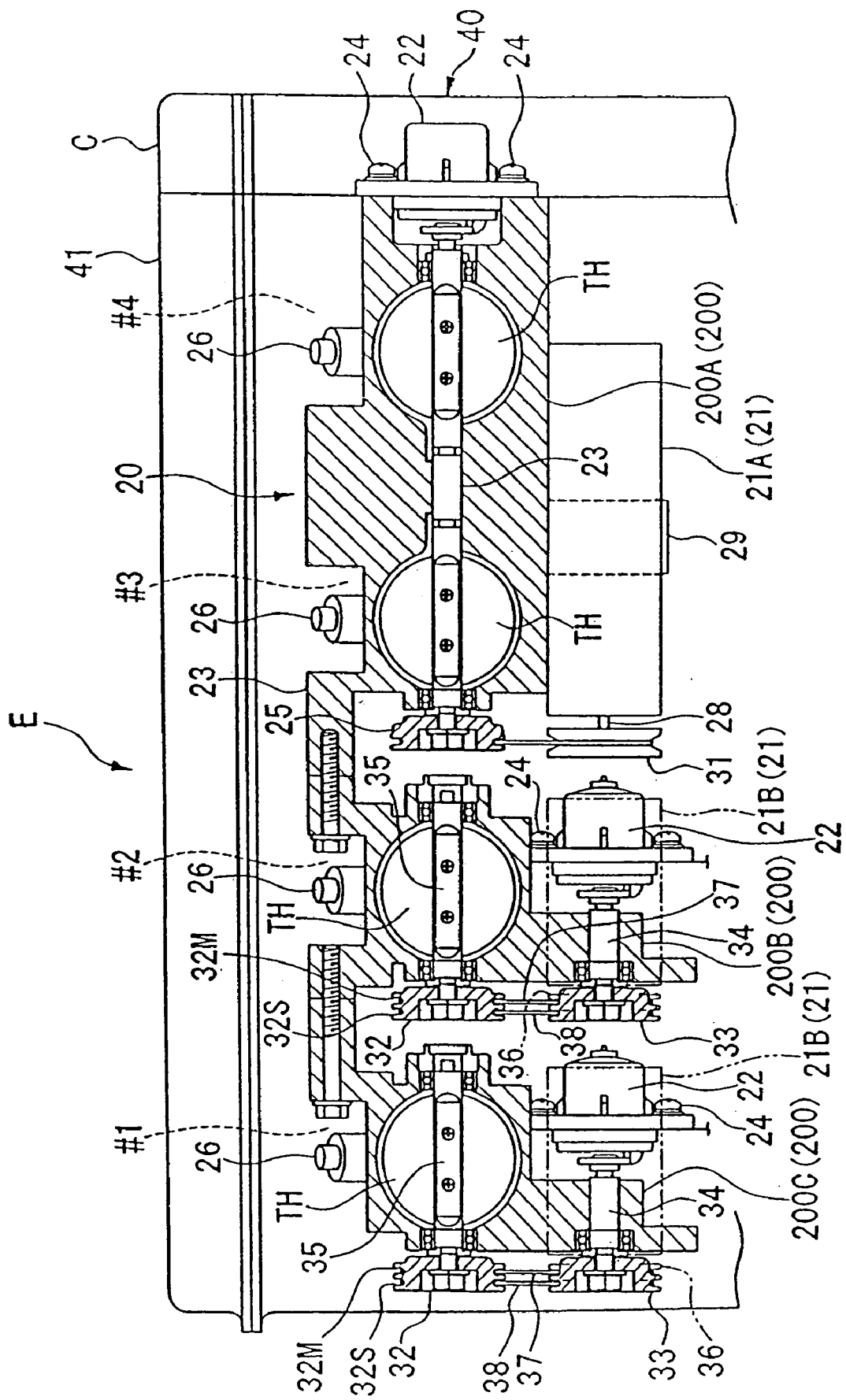
FIG. 4 is a sectional view of the engine along line 4–4 of FIG. 1 showing the throttle body configuration in which the number three and four cylinders form a cylinder group and share a throttle valve control mechanism, the number two cylinder forms a cylinder group and has a throttle valve control mechanism, and the number one cylinder forms a cylinder group and has a throttle valve control mechanism.

As shown in FIG. 4, in the throttle body 20, a throttle body block (throttle valve control mechanism) 200 is provided with four throttle valves TH, TH, TH, TH, wherein a throttle valve TH is provided for each cylinder. The throttle body block 200 is composed by interconnecting a third-fourth throttle body block (throttle valve control mechanism) 200A corresponding to the #4 cylinder and the #3 cylinder, a second throttle body block (throttle valve control mechanism) 200B corresponding to the #2 cylinder, and a first throttle body block (throttle valve control mechanism) 200C corresponding to the #1 cylinder.

Therefore, the #3 cylinder and the #4 cylinder, corresponding to the third-fourth throttle body block 200A, constitute a first cylinder group, the #2 cylinder corresponding to the second throttle body block 200B constitutes a second cylinder group, though it is a single cylinder, and the #1 cylinder corresponding to the first throttle body block 200C constitutes a third cylinder group, though it is a single cylinder. Thus, the engine E according to the illustrative embodiment includes three cylinder groups.

A third-fourth shaft 23 is a throttle valve shaft joining the respective throttle valves TH of the #3 cylinder and the #4 cylinder, for simultaneous concurrent operation of these throttle valves. At an end portion of the third-fourth shaft 23 on the side of the cam chain case C, the throttle valve position sensor 22 is coaxially mounted to the third-fourth throttle body block 200A by small screws 24. In addition, a pulley 25 is mounted to an end portion of the third-fourth shaft 23, on the side thereof opposite to the cam chain case C. On the other hand, an injector 26, for injecting fuel into each intake passage (see FIG. 2), is inserted and fixed to an upper portion, or an upper wall, of the third-fourth throttle body block 200A, for each of the third and fourth throttle valves TH, and the injector is inclined with its lower end aimed toward the cylinder head 40, as shown.

The injector 26 is connected to a fuel supply line 27 (see FIG. 1). In addition, a third-fourth motor (throttle valve control mechanism) 21A is mounted, by a fastening means 29, to the third-fourth throttle body block 200A, on the side of the main body block 200A opposite the injector 26. The drive shaft 28 of the third-fourth motor is parallel to the third-fourth shaft 23. Here, a pulley 31 is mounted to an end portion of the drive shaft 28, on the side of the third-fourth motor 21 A opposite to the cam chain case C.

A pulley 32 for opening and closing the throttle valve TH of the second throttle body block 200B is mounted to an end portion of a throttle shaft 35 on the side of the throttle valve TH opposite to the cam chain case C. The throttle valve position sensor 22 for sensing the throttle opening of the #2 cylinder is mounted to a lower portion of the second throttle body block 200B. A pulley 33 is mounted to an end portion of a sensor shaft 34, on the side of the throttle valve position sensor 22 opposite to the cam chain case C.

Additionally, as shown in FIG. 4, a first auxiliary motor (throttle valve control mechanism) 21B is mounted to the front side of the throttle valve position sensor 22 and on the side of the throttle body TH opposite to the injector 26, through a bracket (not shown). The drive shaft of the first auxiliary motor 21B is parallel to the shaft 35 of the associated throttle valve TH. A pulley 36 is mounted to an end portion of the drive shaft of the first auxiliary motor 21B, on the side thereof opposite to the cam chain case C.

In addition, a pulley groove 32M of the pulley 32 and a pulley groove of the pulley 36 of the motor 21B are connected by an endless wire loop 37, while a pulley groove 32 of the pulley 32 of the shaft 35 and a pulley groove of the pulley 33 of the throttle valve position sensor 22 are connected by an endless wire loop 38.

Similarly, pulleys 32, 33, 36 are mounted to an end portion of the first throttle body block 200C corresponding to the #1 cylinder. The pulleys 32, 33, 36 are mounted on a side of the throttle body TH opposite to the cam chain case C. The throttle valve position sensor 22 and the motor 21 B in a font-rear relationship are mounted to a lower portion of the first throttle body block 200C. The pulley 32 and the pulley 36 of the motor 21B are connected by an endless wire loop 37, while the pulley 32 and the pulley 33 of the throttle valve position sensor 22 are connected by an endless wire loop 38.

As shown in FIGS. 2 and 3, the cylinder head 40 is provided with a recessed portion 43 for defining a combustion chamber 42 together with the cylinder block 30 and a piston 39. The recessed portion 43 is provided with intake valve ports 441, 442 and exhaust valve ports 451, 452. The first intake valve port 441 is opened and closed by a first intake valve 461, and the second intake valve port 442 is opened and closed by a second intake valve 462. Similarly, the first exhaust valve port 451 is opened closed by a first exhaust valve 471, and the second exhaust valve port 452 is opened and closed by a second exhaust valve 472. Incidentally, in the #4 cylinder as shown in FIGS. 2 and 3, the first intake valve 461 is a rest-able (ie, configured to be controlled between a rest mode and an operating mode) intake valve, and the first exhaust valve 471 is a rest-able exhaust valve.

The first and second intake valves 461, 462 have a configuration in which the lower end of a valve stem 49 is integrally connected to a valve body portion 48, capable of closing the corresponding intake valve port 441, 442. The first and second exhaust valves 471, 472 have a configuration in which the lower end of a valve stem 51 is integrally connected to a valve body portion 50 capable of closing the corresponding exhaust valve port 451, 452.

The valve stems 49 of the first and second intake valves 461 and 462 are slidably fitted in valve guide cylinders 52 provided in the cylinder head 40. Similarly, the valve stems 51 of the first and second exhaust valves 471 and 472 are slidably fitted in valve guide cylinders 53 provided in the cylinder head 40.

A retainer 54 is fixed to a portion of the valve stem 49 of the first intake valve 461 which projects upward from the valve guide cylinder 52. The first intake valve 461 is biased, in the direction of closing the first intake valve port 441, by a coil form valve spring 551, provided between the retainer 54 and the cylinder head 40. Similarly, a retainer 54 is fixed to a portion of the valve stem 49 of the second intake valve 462 which projects upwards from the valve guide cylinder 52. The second intake valve 462 is biased, in the direction of closing the second intake valve port 442, by a coil form valve spring 552, provided between the retainer 54 and the cylinder head 40.

In the same manner as above, the first exhaust valve 471 is biased, in the direction of closing the first exhaust valve port 451, by a coil form valve spring 571, provided between a retainer 56 fixed to the valve stem 51 of the first exhaust valve 471 and the cylinder head 40. The second exhaust valve 472 is biased, in the direction of closing the second exhaust valve port 452, by a coil form valve spring 572, provided between a retainer 56 fixed to the valve stem 51 of the second exhaust valve 472 and the cylinder head 40.

The first and second intake valves 461, 462 of the combustion chambers 42 are driven by an intake-side valve operating device 58. The intake-side valve operating device 58 includes a cam shaft 60 provided with first intake-side valve operating cams 591, corresponding respectively to the first intake valves 461, and second intake-side valve operating cams 592 corresponding respectively to the second intake valves 462. The intake-side valve operating device 58 also includes bottomed cylindrical valve lifters 611, slidingly driven by the first intake-side valve operating cams 591, and bottomed cylindrical valve lifters 612, slidingly driven by the second intake-side valve operating cams 592.

The cam shaft 60 has an axis orthogonal to extensions of the axes of the valve stems 49 in the first and second intake valves 461, 462, and is rotatably supported between the cylinder head 40 and the head cover 41 joined to the cylinder head 40. The valve lifters 611 are slidably fitted in the cylinder head 40 in a direction coaxial with the axes of the valve stems 49 in the first intake valves 461, and the closing end outside surfaces of the valve lifters 611 are in sliding contact with the first intake-side valve operating cams 591. Similarly, the valve lifter 612 is slidably fitted in the cylinder head 40 in a direction coaxial with the axes of the valve stems 49 in the second intake valves 462, and the closing end outside surfaces of the valve lifters 612 are in sliding contact with the second intake-side valve operating cams 592.

Moreover, as shown in FIG. 2, the stem ends of the valve stems 49 in the second intake valve 462 are brought into contact with the closing end inside surface of the valve lifter 612 through a shim 62, and are normally opened and closed by the second intake-side valve operating cams 592 during the operation of the engine E.

On the other hand, as shown in FIG. 3, a valve stop mechanism 63 is provided between the valve stem 49 of the first intake valve 461 and the valve lifter 611. The valve stop mechanism effects a change between action and inaction of the pressing force from the valve lifter 611 to the first intake valve 461 in the valve-opening direction, and also brings the first intake valve 461 into the rest state, notwithstanding the sliding operation of the valve lifter 611, by bringing the pressing force into an inactive state in a specified operation range, for example, a low load range such as a low speed operation range of the engine E.

Figure 5:
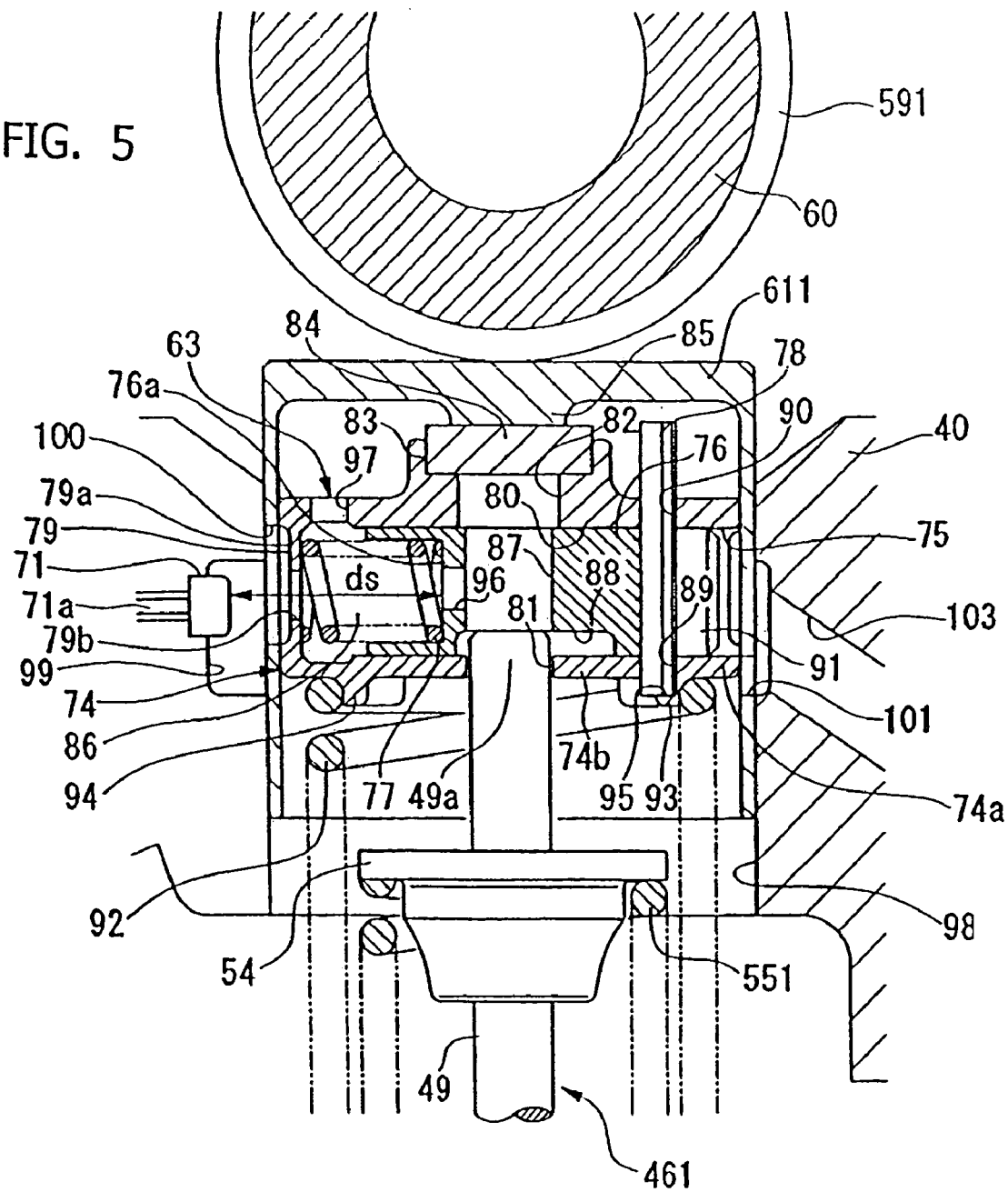
FIG. 5 is a partially enlarged detail sectional view of a portion of FIG. 3, showing the valve stop mechanism provided within the valve lifter of the first intake valve of the fourth cylinder of the engine.

As shown in FIG. 5, which shows a detail view of a part of FIG. 3, the valve stop mechanism 63 includes a pin holder 74 which is slidably fitted in the valve lifter 611, and a slide pin 76 slidably fitted in the pin holder 74 while forming an oil pressure chamber 75 between itself and the inside surface of the valve lifter 611. The valve stop mechanism 63 also includes a return spring 77 which is disposed between the slide pin 76 and the pin holder 74. The return spring 77 provides a spring force for biasing the slide pin 76 in the direction of reducing the volume of the oil pressure chamber 75. The valve stop mechanism 63 further includes a stopper pin 78, disposed between the pin holder 74 and the slide pin 76, while inhibiting the slide pin 76 from rotating about the axis thereof. In addition, a rest discrimination sensor 71 is mounted on the side of the cylinder head 40, for detecting the position of the slide pin 76.

Figure 6:
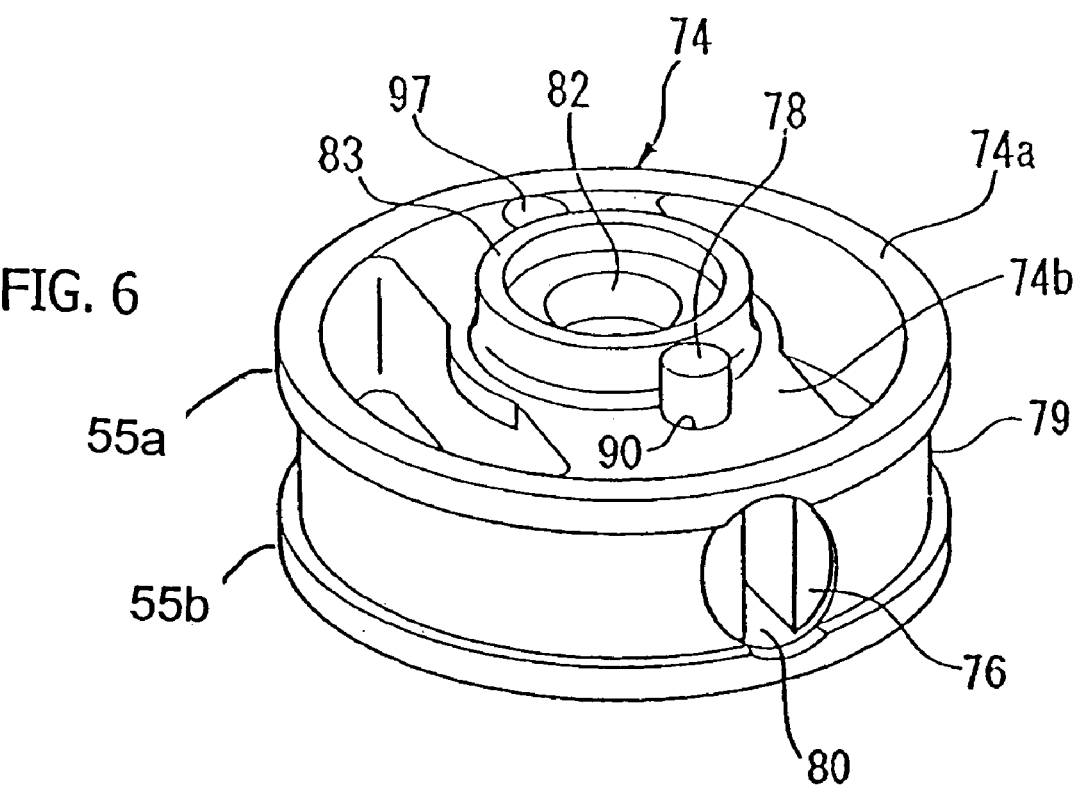
FIG. 6 is an isolated top perspective view of the pin holder of the valve stop mechanism, showing the slide pin within the slide hole formed in the bridge portion.
Figure 7:
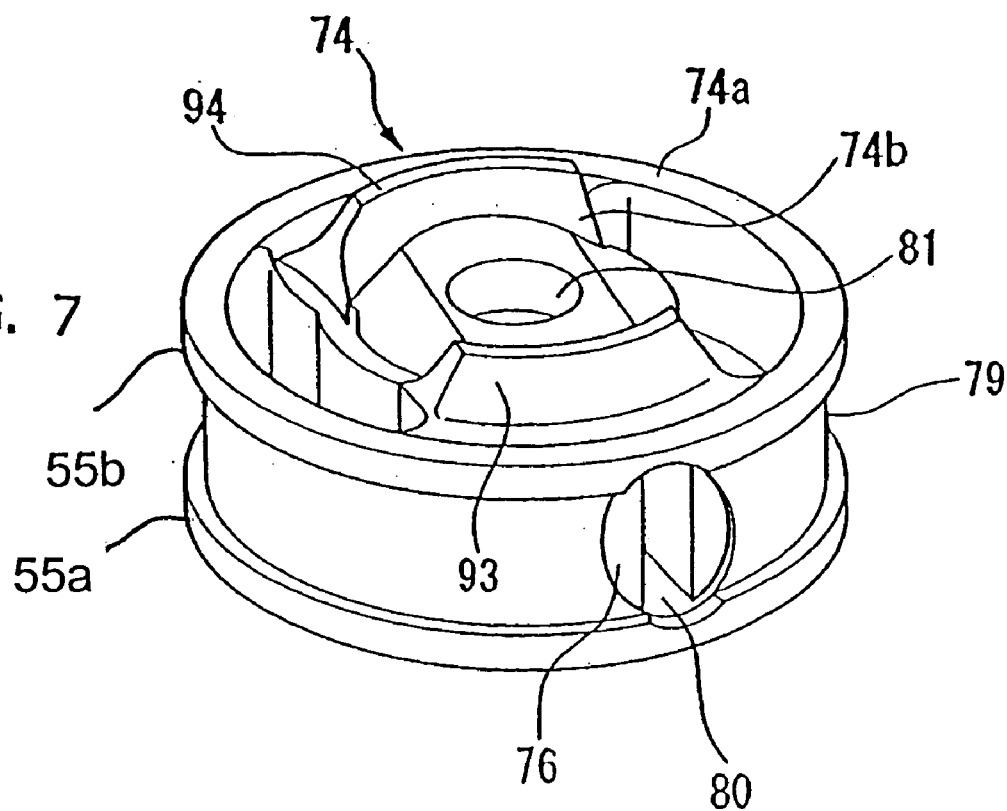
FIG. 7 is an isolated bottom perspective view of the pin holder of the valve stop mechanism, showing an axially aligned insertion hole surrounded by a pair of projections used to position an end portion of a biasing spring.

As shown in FIGS. 6 and 7, the spool-shaped pin holder 74 has a cylindrical ring portion 74a extending around an outer circumference thereof, for slidably fitting in the valve lifter 611 (see FIG. 5). The ring portion 74a is provided with flanges 55a, 55b extending outwardly thereon at both its top and bottom edges, as shown. An annular groove 79 is defined in the outer circumference of the ring portion 74a between the upper and lower flanges 55a, 55b of the ring portion 74a. In addition, a bridge portion 74b extends between and connects inner circumferential portions of the ring portion 74a, and is integrally formed along a diameter of the ring portion 74a (The slide hole 80 is formed inside of the bridge portion 74b). Portions of the pin holder 74 are lightened, that is partially removed, between the inner circumference of the ring portion 74a and both side surfaces of the bridge portion 74b, in order to obtain a reduction in weight. Such a pin holder 74 may be formed by lost wax casting, by forging of iron or an aluminum alloy, or may be formed from a high-strength synthetic resin. A cementation treatment is applied to the outer circumferential surface of the pin holder 74, i.e., the outer circumferential surface of the ring portion 74a, which is made of a metal, and to the inner circumferential surface of the valve lifter 611, thereby affixing the pin holder 74 to the interior surface of the valve lifter 611.

The bridge portion 74b is provided with a slide hole 80 having an axis in the longitudinal direction of the bridge portion 74b, i.e., in a direction orthogonal to the axis of the valve lifter 611. The slide hole 80 has a bottomed shape, with one end being opened to the annular groove 79 and the other end being closed. In addition, the bridge portion 74b is provided in its central lower portion with an insertion hole 81 which communicates with the slide hole 80. The bridge portion 74b is provided in its central upper portion with an extension hole 82 which communicates with the slide hole 80, and which is coaxial with the insertion hole 81. The bridge portion 74b is integrally provided, in the periphery of the extension hole 82, with a hollow cylindrical seat portion 83, extending coaxially with the axis of the extension hole 82. Further, the bridge portion 74b is provided in its upper portion with a upper pin mount hole 90 which communicates with the slide hole 80, positioned in the region extending from a portion corresponding to the one end (open end) of the slide hole 80 to the extension hole 82. Similarly, as shown in FIG. 5, the bridge portion 74b is provided in its lower portion with a lower pin mount hole 89 which communicates with the slide hole 80, positioned in the region extending from a portion corresponding to the one end (open end) of the slide hole 80 to the insertion hole 81. The lower pin mount hole 89 is formed coaxially with the upper pin mount hole 90, and the stopper pin 78 is mounted therein.

A disk-like shim 84 is fitted in the seat portion 83 of the pin holder 74, and an end portion of the extension hole 82 is thereby closed. A projected portion 85 provided at a central portion of the inside surface of the closed end of the valve lifter 611 abuts on the shim 84. A stem end 49a of the valve stem 49 of the first intake valve 461 is inserted in the insertion hole 81 in the lower portion of the pin holder 74. In addition, the slide pin 76 is slidably fitted in the slide hole 80. The oil pressure chamber 75 communicates with the annular groove 79 and is formed between one end of the slide pin 76 and the inside surface of the valve lifter 611. The return spring 77 is contained in a spring chamber 86 formed between the other end of the slide pin 76 and the closed end of the slide hole 80. In cases where the pin holder 74 is made of a synthetic resin, its portion for sliding contact with the slide pin 76 may only be made of a metal.

Figure 8:
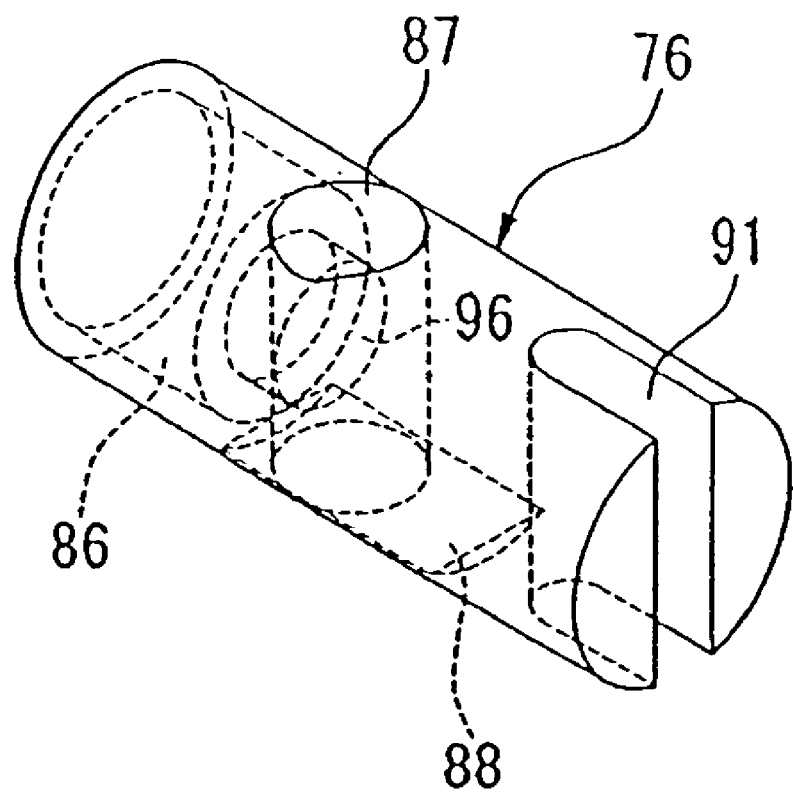
FIG. 8 is a perspective view of a slide pin, showing a slit formed in one end, a flat abutment surface formed along a bottom surface thereof, and a containing hole extending transversely through the pin and opening at one side of the abutment surface.

As shown in FIGS. 5 and 8, the slide pin 76 is provided with a containing hole 87 in an intermediate portion in the axial direction thereof. The containing hole 87 coaxially communicates with the insertion hole 81 and the extension hole 82, and has such a diameter that the stem end 49a of the valve stem 49 can be contained therein. Further, an end portion of the containing hole 87, on the side of the insertion hole 81, is opened to a flat abutment surface 88 formed on the outside surface of a lower portion of the slide pin 76 oppositely to the insertion hole 81. Here, the abutment surface 88 is formed to be comparatively long along the axial direction of the slide pin 76, and the containing hole 87 is opened to a portion of the abutment surface 88, on the side of the spring chamber 86. In addition, a slit 91, opened toward the side of the oil pressure chamber 75, is provided on one end side of the slid pin 76. A magnetism generating member such as a magnet is embedded in the slid pin 76 so as to enhance the detection accuracy of a rest discriminating magnetic sensor 71 which will be described later.

Additionally, the slid pin 76 is provided with a communication hole 96 for permitting communication between the spring chamber 86 and the containing hole 87. The communication hole 96 prevents variations in the pressure inside the spring chamber 86 from occurring when the slid pin 76 is moved in the axial direction. Further, as shown in FIG. 5, the pin holder 74 is provided with a communication hole 97 for permitting communication between the spring chamber 86 and the space between the pin holder 74 and the valve lifter 611. The communication hole 97 prevents the pressure in the space from varying with temperature. In addition, a wall portion 79a of the annular groove 79 forming the spring chamber 86 is provided with an opening 79b. The diameter of the opening 79b is set smaller than the diameter of the return spring 77.

Further, a coil spring 92 for biasing the pin holder 74 in the direction of abutting the shim 84 mounted to the pin holder 74 against the projected portion 85 of the valve lifter 611 is provided between the pin holder 74 and the cylinder head 40. The coil spring 92 is mounted so as to surround the valve stem 49 at such a position as to obviate the contact of its outer circumference with the inside surface of the valve lifter 611. The lower surface of the bridge portion 74b of the pin holder 74 is integrally provided with a pair of projections 93, 94 for positioning an end portion of the coil spring 92 in a direction orthogonal to the axis of the valve stem 49.

Both the projections 93, 94 are projectingly provided integrally on the pin holder 74 with a projection amount not more than the wire diameter of the coil spring 92, and are formed in a circular arc shape, with the axis of the valve stem 49 as a center of the circle. In addition, one 93 of the projections 93, 94 is provided with a step portion 95. Step portion 95 abuts an end portion of the stopper pin 78, on the side of the first intake valve 46I, to thereby inhibit the stopper pin 78 from moving toward the side of the first intake valve 46I.

The cylinder head 40 is provided with a support hole 98 for fitting the valve lifter 61I therein so as to slidably support the valve lifter 61I. The support hole 98 is provided in its inside surface with an annular recessed portion 99 for surrounding the valve lifter 61I. The annular recessed portion 99 is connected to a working oil pressure supply passage 103 formed in the cylinder head 40, and is supplied with a working oil. Additionally, the valve lifter 61I is provided with a release hole 101 and a communication hole 100 for permitting communication between the annular recessed portion 99 and the annular groove 79 in the pin holder 74.

The communication hole 100 is provided at such a position as to permit communication between the annular recessed portion 99 and the annular groove 79 notwithstanding the sliding of the valve lifter 61I in the support hole 98. The release hole 101 is provided in the valve lifter 61I at such a position that the annular recessed portion 99 communicates with the inside of the valve lifter 61I on the lower side of the pin holder 74 when the valve lifter 61I is moved to an uppermost position as shown in FIG. 5 and that the communication with the annular recessed portion 99 is interrupted as the valve lifter 61I is moved downwards from the uppermost position as shown in FIG. 5, and the working oil is jetted through the release hole 101 into the inside of the valve lifter 61I as a lubricating oil.

The working oil supplied from the working oil pressure supply passage 103 into the annular groove 79 of the pin holder 74 through the communication hole 100 and the release hole 101 is supplied into the oil pressure chamber 75 via one end of the slide hole 80. The slide pin 76 is slid in the axial direction in such a manner that an oil pressure force acting on one end side of the slide pin 76 due to the oil pressure inside the oil pressure chamber 75 and a spring force acting on the other end side of the slide pin 76 due to the return spring 77 balance each other. At a non-operation time when the oil pressure in the oil pressure chamber 75 is low, the stem end 49a of the valve stem 49 inserted in the insertion hole 81 is moved to the right side in FIG. 5 so as to be contained into the containing hole 87 and the extension hole 82. In a working condition where the oil pressure in the oil pressure chamber 75 is high, the stem end 49a of the valve stem 49 is moved to the left side in FIG. 5 so as to stagger the containing hole 87 from the axes of the insertion hole 81 and the extension hole 82 and to abut on the abutment surface 88 of the slide pin 76.

Here, the rotation of the slide pin 76 about its axis is inhibited by the stopper pin 78. The stopper pin 78 pierces through the slit 91 of the slide pin 76. Specifically, the stopper pin 78 is mounted to the pin holder 74 by piercing through the slide pin 76 while permitting the slide pin 76 to move in the axial direction, so that the abutment of the stopper pin 78 on an inner end closed portion of the slit 91 restricts the end of movement of the slide pin 76 to the side of the oil pressure chamber 75.

Further, the rest discriminating magnetic sensor 71 is mounted to the annular recessed portion 99 of the cylinder head 40 while confronting the communication hole in the valve lifter 61I and on the opening 79b in the pin holder 76. The rest discriminating magnetic sensor 71 is a sensor which detects the distance ds from the rest discriminating magnetic sensor 71 through the communication hole 100 and the opening 79b to a wall portion 76a of the slide pin 76. The sensor 71 includes a magnet and a coil, and detects the distance ds by detecting a magnetic flux variation generated when the slide pin 76, made of a metal, is moved. A cable 71a for outputting the detection results is connected to the rest discriminating magnetic sensor 71. The cable 71a is passed through an insertion hole formed in the cylinder head 40, and is connected to an ECU (cylinder number control unit) 70 (see FIG. 9) which will be described later. Incidentally, such a rest discriminating sensor is not limited to the magnetic sensor. Alternatively, there may be used a sensor for detecting the distance ds by use of light, a sensor for detecting the distance ds by detecting a variation in electrostatic capacity, a sensor for detecting the distance ds by use of ultrasound, and the like.

As shown in FIGS. 2 and 3, the first and second exhaust valves 47I, 47II of the combustion chambers 42 are driven by an exhaust-side valve operating device 68. The exhaust-side valve operating device 68 has a camshaft 65 provided with a first exhaust-side valve operating cams 64I corresponding respectively to the first exhaust valves 47I and with second exhaust-side valve operating cams 64II corresponding respectively to the second exhaust valves 47II. The exhaust side view of the device has bottomed hollow cylindrical valve lifters 66I slidingly driven by the first exhaust-side valve operating cams 64I and bottomed hollow cylindrical valve lifters 66II slidingly driven by the second exhaust-side valve operating cams 64II.

The camshaft 65 has an axis orthogonal to the extensions of the axes of the valve stems 51 of the first and second exhaust valves 47I, 47II, and is rotatably supported between the cylinder head 40 and the head cover 41 joined to the cylinder head 40, like the camshaft 60 of the intake-side valve operating device 58. The valve lifters 66I are slidably fitted in the cylinder head 40 coaxially with the axes of the valve stems 51 of the first exhaust valves 47I, and the outside surfaces of the closed ends of the valve lifters 66I are in sliding contact with the first exhaust-side valve operating cams 64I.

In addition, the valve lifters 66II are slidably fitted in the cylinder head 40 coaxially with the axes of the valve stems 51 of the second exhaust valves 47II, and the outside surfaces of the closed ends of the valve lifters 66II are in sliding contact with the second exhaust-side valve operating cams 64II.

The stem end of the valve stem 51 of the second exhaust valve 47II abuts on the inside surface of the closed end of the valve lifter 66II through the shim 67, and are normally opened and closed by the second exhaust-side valve operating cam 64II during the operation of the engine E. In addition, a valve stop mechanism 69 effects a change between action and inaction of the pressing force exerted from the valve lifter 66I on the first exhaust valve 47I in the valve-opening direction, and brings the first exhaust valve 47I into a resting state irrespective of the sliding of the valve lifter 66I by putting the pressing force into an inactive state in a specified operation range of the engine E, for example, in a low load range such as a low speed operation range. The valve stop mechanism 69 is provided between the stem ends 51a of the valve stem 51 of the first exhaust valve 47I and the valve lifter 661. The valve stop mechanism 69 of the exhaust-side valve operating device 68 is configured in the same manner as the valve stop mechanism 63 (see FIG. 5) in the intake-side valve operating device 58.

In the #3 cylinder, the valve stop mechanism 63 and the valve stop mechanism 69, configured in the same manner as in the #4 cylinder, are provided for the second exhaust valve 472 (corresponding to a second exhaust valve port 452) and the second intake valve 462 (corresponding to a second intake valve port 442), while the first exhaust valve 471 and the first intake valve 461 are not provided with respective valve stop mechanisms 63, 69, in a manner contrary to that in the #4 cylinder. Further, in the #1 cylinder and the #2 cylinder, the valve stop mechanism 63 and the valve stop mechanism 69 are provided for all the intake valves 461, 462 and the exhaust valves 471, 472.

Therefore, since in the #1 cylinder and the #2 cylinder the valve stop mechanisms 63, 69 are provided for all the engine valves, these valve stop mechanisms 63, 69 function as a cylinder resting mechanism, and a cylinder rest where all the engine valves are in rest (the cylinders are rest-able cylinders) can be performed. Additionally, in the #3 cylinder and the #4 cylinder, a valve rest where one engine valve each on the intake side and the exhaust side is in rest (the cylinders are normally operative cylinders) can be performed.

As shown in FIG. 1, a side wall on the #4 cylinder side of the cylinder head 40 is provided with a cam chain case C, and a cam chain (not shown) for driving the camshafts 60, 65 of the intake-side and exhaust-side valve operating devices 58, 68 are contained in the cam chain case C. A side wall of the cylinder head 40 on the opposite side of the cam chain case C is provided with connection ports PA, PB, PC of oil pressure control valves 113A, 113B, 113C for controlling the supply of the working oil to the valve stop mechanisms 63, 69 (see FIGS. 2 and 3) of the intake-side and exhaust-side valve operating devices 58, 68.

The connection port PA is connected to a working oil supply passage 103A which extends in the cylinder head 40 between a central portion in the front-rear direction of the cylinder head 40 to each intake valve port along the longitudinal direction to the layout position of the second intake valve port 442 of the #2 cylinder and which is branched toward the second intake valve port 442 of the #2 cylinder and the second exhaust valve port 452 of the #2 cylinder.

The connection port PB is connected to a working oil supply passage 103B which extends in the cylinder head 40 between a central portion in the front-rear direction of the cylinder head 40 to each exhaust valve port along the longitudinal direction to the layout position of the first exhaust valve port 451 of the #1 cylinder and which is branched toward the first exhaust valve port 451 of the #1 cylinder and the first intake valve port 441 of the #1 cylinder.

The connection port PC is connected to a working oil supply passage 103C which extends in the other side wall of the cylinder head 40 along the longitudinal direction to the layout position of the first exhaust valve port 451 of the #4 cylinder and which is branched toward the first exhaust valve port 451 of the #4 cylinder, the second exhaust valve port 452 of the #3 cylinder, the first exhaust valve port 451 of the #2 cylinder and the second exhaust valve port 452 of the #1 cylinder.

In addition, in correspondence with the working oil supply passage 103C, a working oil supply passage 103C' is formed in the rear side wall of the cylinder head 40 along the longitudinal direction of the cylinder head 40 to the layout position of the first intake valve port 441 of the #4 cylinder, and the working oil supply passage 103C and the working oil supply passage 103C' are connected to each other through a crossing passage 103X. Additionally, the working oil supply passage 103C' is branched to be connected to the first intake valve port 441 of the #4 cylinder, the second intake valve port 442 of the #3 cylinder, the first intake valve port 441 of the #2 cylinder and the second intake valve port 442 of the #1 cylinder.

Therefore, in the #1 cylinder and the #2 cylinder, among the #1 cylinder, the #2 cylinder and the #3 cylinder, i.e., the cylinders located on the opposite side of the cam chain case C, all the engine valves consisting of the first intake valve 461, the second intake valve 462, the first exhaust valve 471 and the second exhaust valve 472 are configured to be rest-able.

When solenoids (not shown) are turned ON, the oil pressure control valves 113A, 113B, 113C are so operated that a working oil pressure is exerted on the connection ports PA, PB, PC via an in-port IN; when the solenoids are turned OFF, the exerted oil pressure is led to a drain port D, and the oil pressure control valves 113A, 113B, 113C are so operated that the working oil is supplied to the valve stop mechanisms 63, 69 through the working oil supply passage 103A, the working oil supply passage 103B, and the working oil supply passage 103C (103C'). Incidentally, in FIG. 1, symbol IN denotes an in-port, OUT denotes an out-port, and D denotes a drain port.

Figure 9:
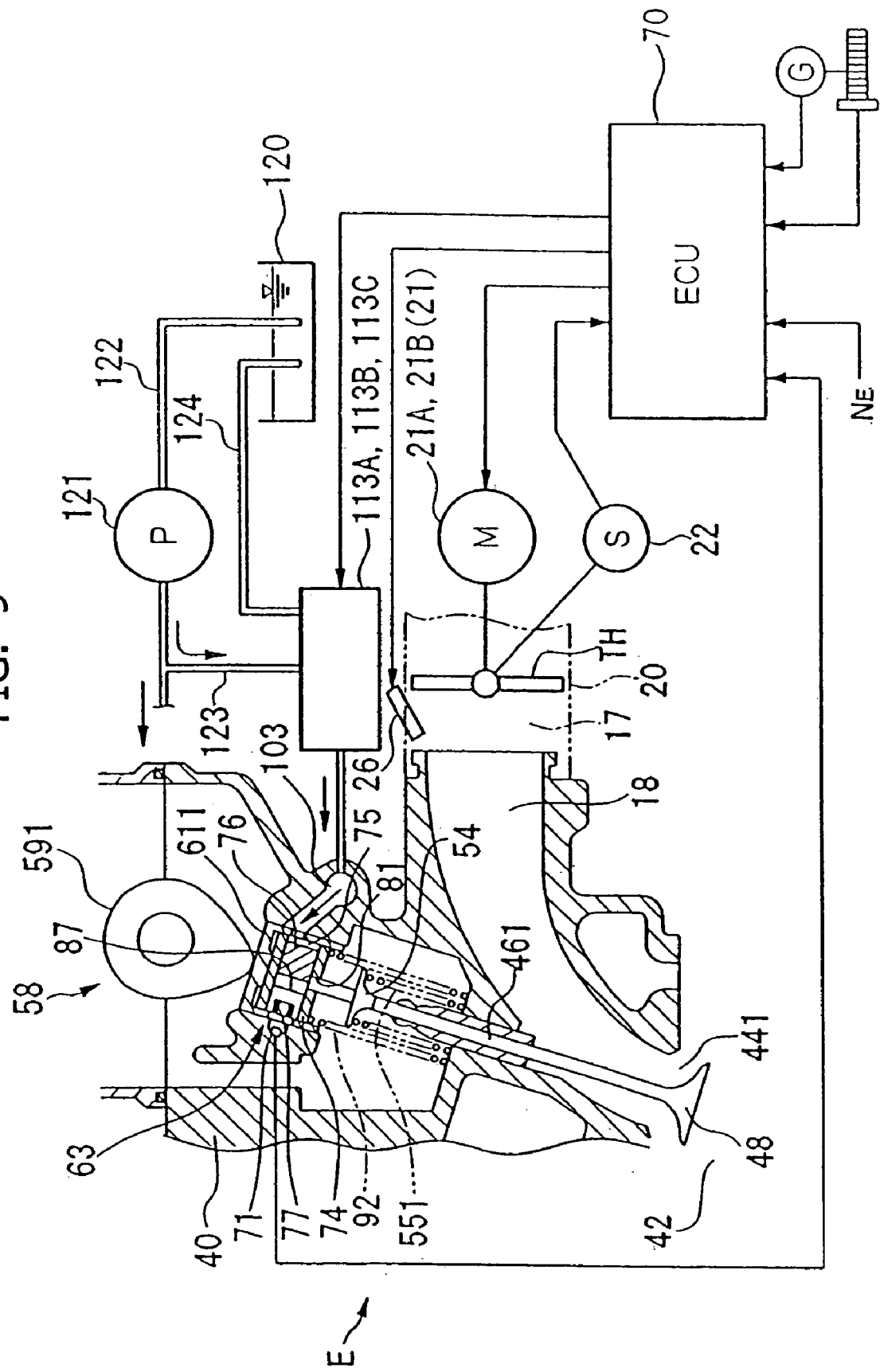
FIG. 9 is a system diagram showing a valve operating condition.

As shown in FIG. 9, the oil pressure control valves 113A, 113B, 113C are supplied with the working oil which is reserved in an oil pan 120. A main oil pressure passage 122 fitted with a pump 121 is connected to the oil pan 120, and, on the discharge side of the pump 121, a branch passage 123 connected to the oil pressure control valves 113A, 113B, 113C is branched from the main oil pressure passage 122. In addition, the drain ports D (see FIG. 1) of the oil pressure control valves 113A, 113B, 113C are connected to a drain passage 124 so that the working oil can be recovered into the oil pan 120.

The control of the oil pressure control valves 113A, 113B, 113C is conducted by the ECU 70, which is an electronic control unit, based on the handgrip opening θg detected by a handgrip opening sensor G, the engine speed Ne, the rest discriminating magnetic sensor 71 and the like. In addition, the ECU 70 controls the throttle valve TH by outputting a turning command signal to each of the motors 21A, 21B while detecting the throttle valve opening by a throttle valve position sensor 22 so as to set optimum the throttle valve opening based on the value detected by the handgrip opening sensor G and the like. Further, fuel injection amount at the injector 26 is regulated based on a control signal from the ECU 70. Thus, the ECU 70 has means for changing over the oil pressure control valves 113A, 113B, 113C, means for controlling the throttle valve opening, and a means for controlling the fuel injection amount.

Next, the valve rest and the cylinder rest conducted under the control by the ECU 70 will be described, the description being centered on the operations of the intake valves 461, 462 and the exhaust valves 471, 472 provided with the valve stop mechanisms 63, 69.

As shown in FIG. 9, when the valve rest and the cylinder rest are not conducted, the ECU 70 drives the throttle valve TH by outputting the turning command signal to each of the motors 21A, 21B while detecting the throttle valve opening by the throttle valve position sensor 22, based on the detection signals fed from the handgrip opening sensor G and the like. In addition, the fuel injection amount at the injector 26 is regulated based on the control signal from the ECU 70.

The oil pressure chamber 75 of the valve stop mechanism 63 is supplied with the working oil via the working oil supply passage 103, whereby the return spring 77 is compressed, and the slide pin 76 is located on a comparatively left side in FIG. 9. Additionally, the valve stop mechanism 69 on the exhaust side as shown in FIG. 2 is also configured so that the oil pressure of the working oil acts on the slide pin 76.

Therefore, when the valve lifter 611 is slid by the pressing force exerted from the intake-side valve operating device 58, the pin holder 74 and the slide pin 76 are accordingly moved to the side of the first intake valve 461, and, attendant on this, a pressing force in the valve opening direction is exerted on the first intake valve 461, whereby an air-fuel mixture is taken through the first intake valve port 441 into the combustion chamber 42 (intake stroke). The mixture gas in the combustion chamber 42 is compressed by the piston 38 (see FIG. 2) and is then ignited by a spark plug (not shown) into combustion.

In addition, as shown in FIG. 2, when the valve lifter 661 is slid by a pressing force exerted from the exhaust-side valve operating device 68, the pin holder 74 and the slide pin 76 are accordingly moved to the side of the exhaust valve 471, and, attendant on this, a pressing force in the valve opening direction is exerted on the exhaust valve 471, whereby an exhaust gas is exhaust through the first exhaust valve port 451 to the exhaust port 19 (exhaust stroke).

Figure 10:
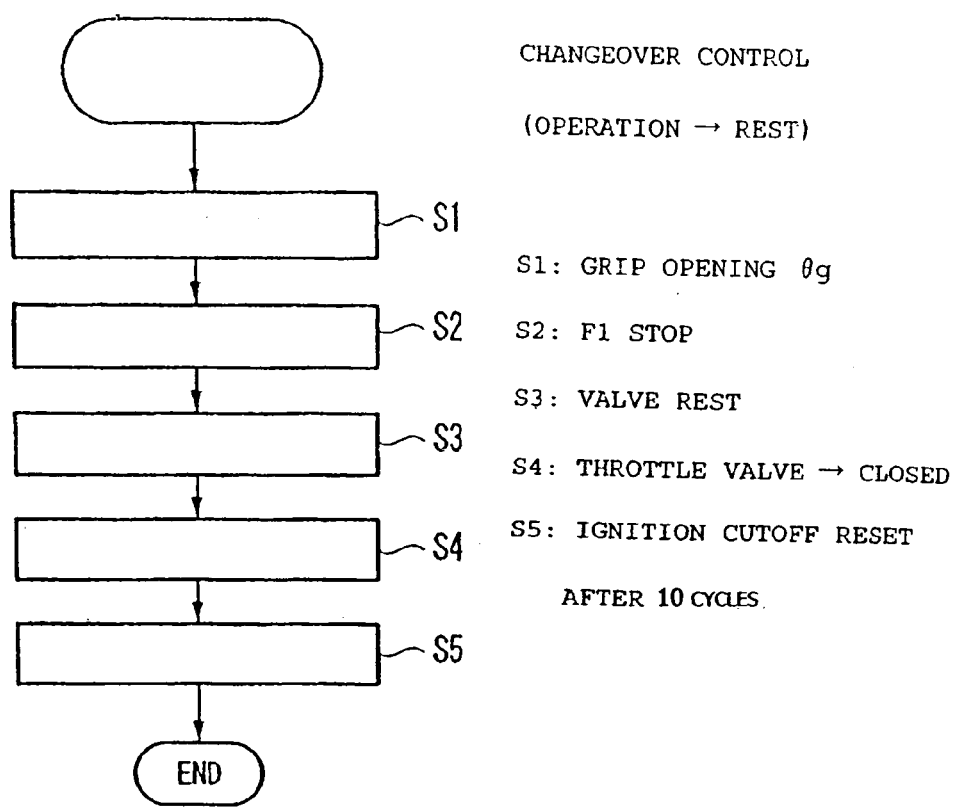
FIG. 10 is a flow chart showing the process of changeover, or transitioning, from valve operation to valve rest.

The processing by the ECU 70 in the case where predetermined conditions are fulfilled and the valve rest and cylinder rest are conducted will be described based on a flow chart shown in FIG. 10. First, the ECU 70 detects the handgrip opening θg (step S1), and the passage of current to the injector 26 is stopped, thereby stopping the fuel supply (F1) (step S2). Thereafter, the exhaust valves 471, 472 and the intake valves 461, 462 are rested (step S3).

The resting of the exhaust valves 471, 472 and the intake valves 461, 462 is carried out as follows.

After the completion of the exhaust stroke is confirmed by a crank angle sensor (not shown) or the like, a control signal is outputted to each of the oil pressure control valves 113 A, 113B, 113C, to discharge the working oil from the oil pressure chamber 75 (see FIG. 5), and the exhaust valves 471, 472 are rested. The resting of the exhaust valves 471, 472 is confirmed by use of the rest discriminating magnetic sensor 71. When the above-mentioned distance ds detected by the rest discriminating magnetic sensor 71 has reached a distance corresponding to the position where the containing hole 87 and the insertion hole 81 are matched, the ECU 70 determines that the exhaust valves 471, 472 corresponding to the rest discriminating magnetic sensor 71 has come to a rest.

After the resting of the exhaust valves 471, 472 is confirmed, a control signal is outputted to each of the oil pressure control valves 113A, 113B, 113C, to stop the intake valves 461, 462. The resting of the intake valves 461, 462 is also conducted based on the distance ds detected by the rest discriminating magnetic sensor 71 provided in the vicinity of the stem end 49a of each of the intake valves 461, 462, in the same manner as above.

Then, the throttle valve TH is put into a closed state by driving the motors 21A, 21B (step S4), and the supply of electric power to the spark plug is interrupted (step S5). The cutoff of ignition is carried out for several cycles (in this embodiment, 10 cycles), and thereafter the ignition is reset. This makes it possible to confirm the cylinder rest (resting of the cylinder) with a predetermined timing, to prevent the temperature of the spark plug from being lowered at the time of re-operation, and to securely perform the cylinder re-operation with a predetermined timing.

Figure 11:
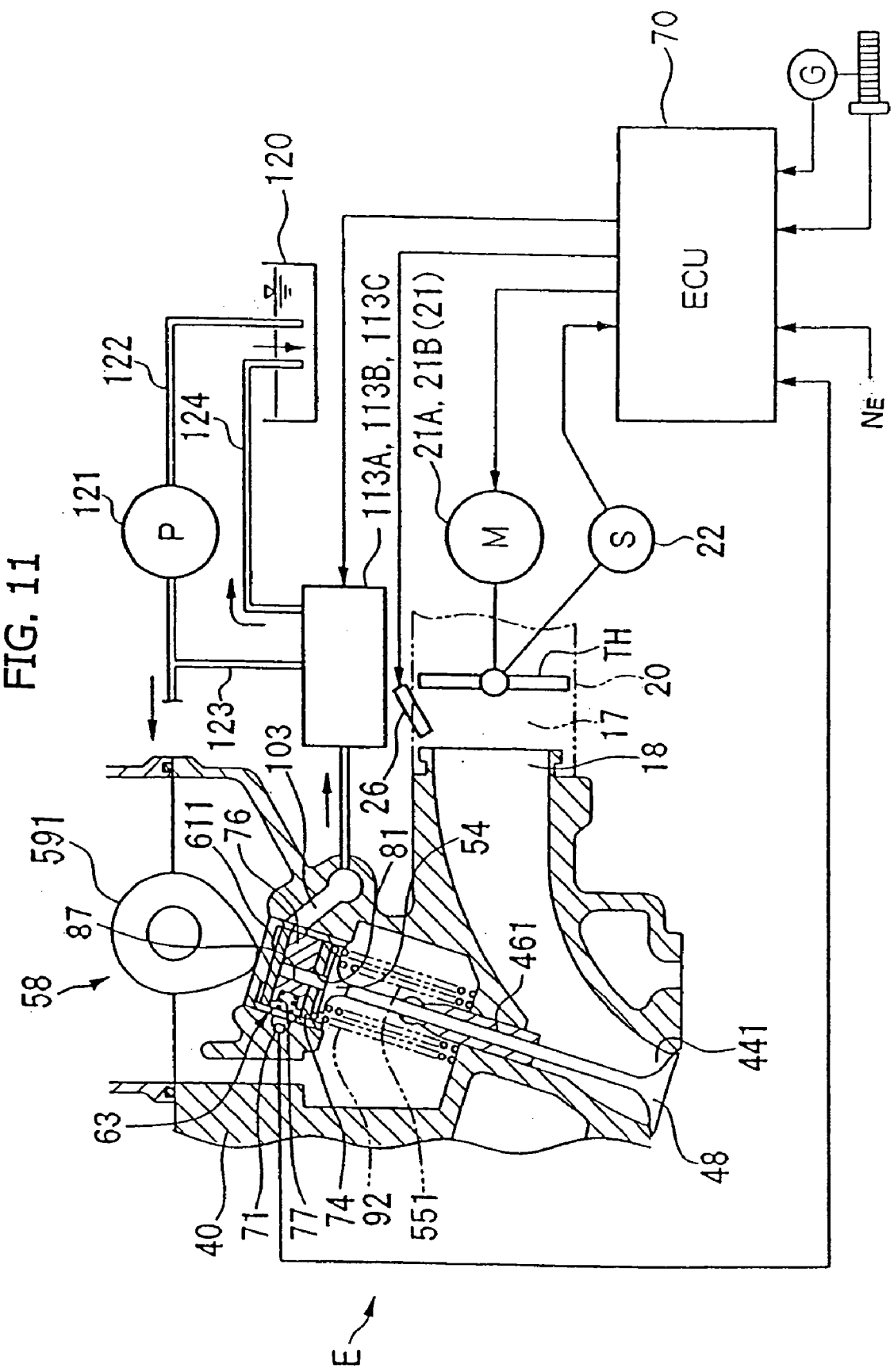
FIG. 11 is a system diagram showing a valve rest condition.

Under the above-mentioned control, the working oil is discharged via the drain passage 124 as shown in FIG. 11, the slide pin 76 is moved by the force of the return spring 77 so as to reduce the oil pressure chamber 75, and the containing hole 87 is matched to (aligned with) the insertion hole 81 in the pin holder 74. Even when the valve lifter 611 is moved toward the side of the first intake valve 461 by the intake-side valve operating device 68 in this condition, the stem end 49a (see FIG. 5) of the valve stem 49 is received within the insertion hole 81 and the containing hole 87, and no pressing force is exerted on the first intake valve 461, so that the first intake valve port 441 is kept closed.

In addition, the working oil is similarly discharged also from the valve stop mechanism 69 on the exhaust side as shown in FIG. 3, the containing hole 87 is matched to (aligned with) the insertion hole 81 in the pin holder 74, and no pressing force is exerted on the first exhaust valve 471, so that the first exhaust valve port 451 is kept closed.

Next, the processing by the ECU 70 in the case of resetting a cylinder in the resting state, the intake valves 461, 462 and the exhaust valves 471, 472 will be described based on a flow chart shown in FIG. 12.

First, the ECU 70 detects the handgrip opening θg (step S11), and brings the throttle valve TH into an open state by driving the motors 21A, 21B while detecting the throttle valve opening by the throttle valve position sensor 22, based on the handgrip opening θg (step S12).

Then, the intake valves 461, 462 and the exhaust valves 471, 472 are operated (step S13). The operations of the exhaust valves 471, 472 and the intake valves 461, 462 are conducted as follows.

First, a control signal is outputted to each of the oil pressure control valves 113A, 113B, 113C, whereby an oil pressure is exerted on the slide pin 76 to move the slide pin 76, to operate the first exhaust valve 471. The operations of the exhaust valves 471, 472 are confirmed by use of the rest discriminating magnetic sensor 71. When the distance ds detected by the rest discriminating magnetic sensor 71 has come to be a distance corresponding to a position where the containing hole 87 and the insertion hole 81 are not aligned with each other, the ECU 70 determines that the exhaust valve 471, 472 corresponding to the rest discriminating magnetic sensor 71 has changed over to an operative state.

After the operations of the exhaust valves 471, 472 is confirmed, a control signal is outputted from the ECU 70 to each of the oil pressure control valves 113A, 113B, 113C (see FIG. 1), whereby the intake valves 461, 462 are operated. The operations of the intake valves 461, 462 are confirmed based on the distance ds detected by the rest discriminating magnetic sensor 71, in the same manner as above. After the operations of the intake valves 461, 462 are confirmed, the injector 16 is operated, to start the fuel supply (step S14). Incidentally, in this instance, the cutoff of ignition has been reset, so that the engine is driven by starting the fuel supply.

Figure 15:
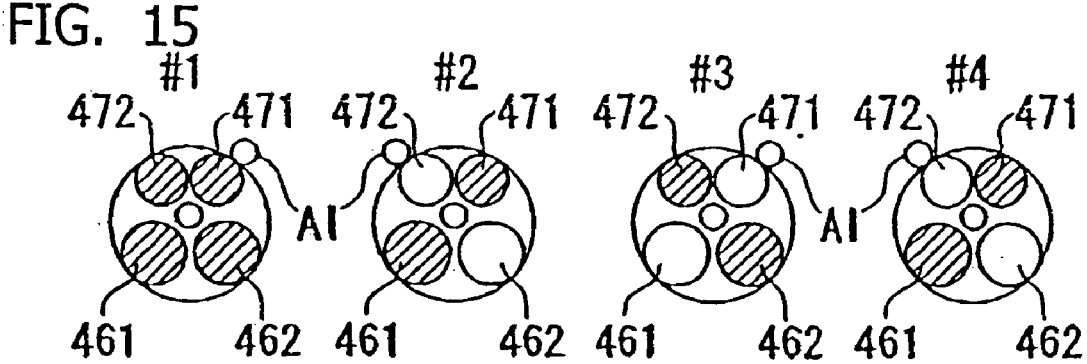
FIG. 15 is an illustration of the valve condition for the valves of each of the four cylinders where the handgrip opening is in the range of θg2 to θg1.
Figure 16:
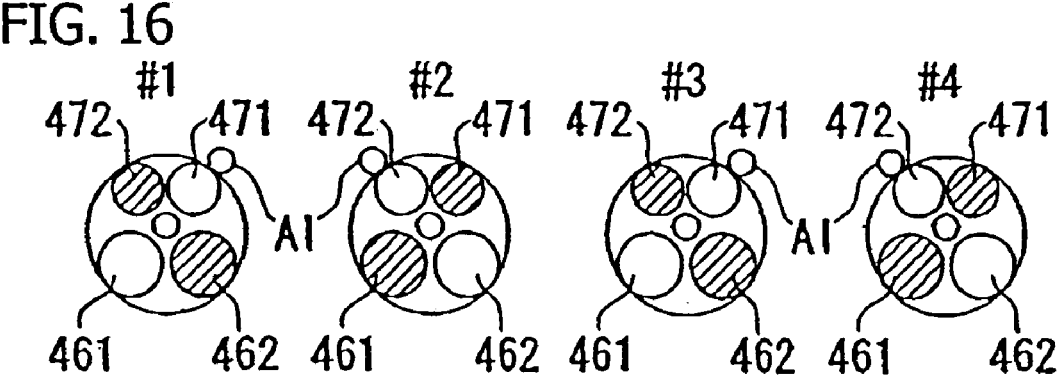
FIG. 16 is an illustration of the valve condition for the valves of each of the four cylinders where the handgrip opening is not less than θg2.

Now an explanation is provided as to how the engine valves (the exhaust valves 471, 472 and the intake valves 461, 462) are operated according to the handgrip opening θg and how the throttle valve TH is opened to increase the engine output will be described, based on FIGS. 14 to 16. Incidentally, in FIGS. 14 to 16, the hatched valves are the engine valves in the resting state. When the intake valves 461, 462 and the exhaust valves 471, 472, which are the engine valves, are all rested (all valve rest), cylinder rest results. Here, the first intake valve 461 and the first exhaust valve 472 are disposed on a diagonal line, while the second intake valve 462 and the second exhaust valve 472 are disposed on a second diagonal line, the adjacent exhaust valves 471, 472 of the two adjacent cylinders are configured as operative valves, and a secondary air introduction valve (exhaust device) AI is provided between the exhaust valves 471, 472 (exclusive of the portion between the #2 cylinder and the #3 cylinder).

As shown in FIG. 13, in the engine E of this embodiment, the cylinders to be operated and the throttle valve opening in each cylinder group are determined uniquely, on the basis of the handgrip opening θg best representing the driver's intention to accelerate. Specifically, the number of the cylinder groups to be operated is increased with an increase in at least the handgrip opening θg. In addition, whether the cylinder is to be rested or operated is determined based on whether the engine speed Ne is higher or lower than a threshold value α. These are controlled by the ECU 70.

First, the case where the engine speed Ne is lower than a threshold value α will be described. In this case, 2-valve operation for a low load time is established in which the individual cylinder groups, here, the cylinder group composed of the #3 cylinder and the #4 cylinder, the cylinder group composed of the #2 cylinder (in this embodiment, a single cylinder), and the cylinder group composed of the #1 cylinder (in this embodiment, a single cylinder) are each operated by use of single intake and exhaust valves.

First, in the range from an idling condition to the condition where the handgrip opening θg is an opening θg2, the cylinder rest (all valve rest) is conducted in the #1 cylinder and the #2 cylinder, the valve rest is conducted in the #3 cylinder and the #4 cylinder, and, in this condition, the throttle valve opening is gradually increased with an increase in the handgrip opening θg.

Figure 14:
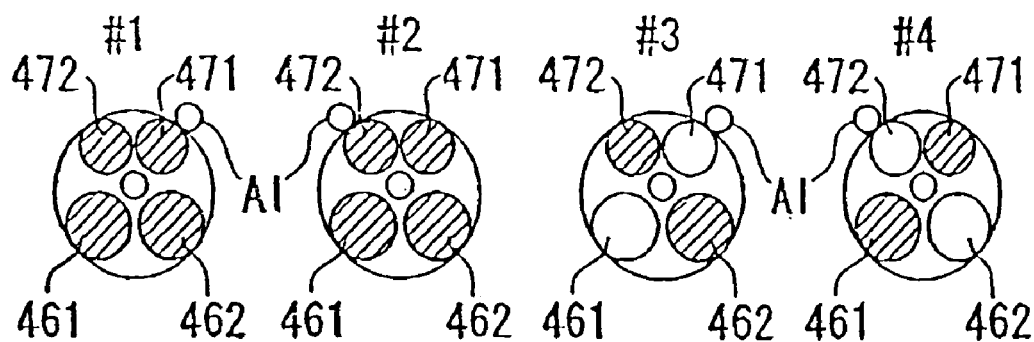
FIG. 14 is an illustration of the valve condition for the valves of each of the four cylinders where the handgrip opening is in the range of 0 to θg2.

In other words, in the condition shown in FIG. 14, the throttle valve TH for the #3 cylinder and the #4 cylinder is gradually opened (2-cylinder 2-valve operation shown in FIG. 13). Here, the average of an increase ratio (dTH/dθg) of the throttle valve opening to the handgrip opening in the #3 cylinder and the #4 cylinder is set higher than the average of the increase ratio of the throttle valve opening to the handgrip opening in the #2 cylinder.

Next, when the handgrip opening θg comes to be θg2, cylinder rest (all valve rest) is conducted in the #1 cylinder, while valve rest is conducted in the #2 cylinder, the #3 cylinder, and the #4 cylinder, and, in this condition, the throttle valve TH of the #2 cylinder is started to open, in addition to the #3 cylinder and the #4 cylinder in which the throttle valve opening thereafter increases continuously. That is, in the condition shown in FIG. 15, the throttle valve TH in the #2 cylinder, in addition to the #3 cylinder and the #4 cylinder, is gradually opened (3-cylinder 2-valve operation shown in FIG. 13). Here, the average of the increase ratio of the throttle valve opening to the handgrip opening in the #2 cylinder is set to be higher than that in the #1 cylinder in which the throttle valve is next started to open.

Then, when the handgrip opening θg2 becomes an opening θg1, valve rest is conducted in all cylinders from the #1 cylinder to the #4 cylinder, and, in this condition, the throttle valve TH of the #1 cylinder is started to open, in addition to the #3 cylinder, the #4 cylinder, and the #2 cylinder in which the throttle valve thereafter increases continuously. Namely, in the condition shown in FIG. 16, the throttle valve TH in the #1 cylinder, in addition to the #3 cylinder and the #4 cylinder, is gradually opened (4-cylinder 2-valve operation shown in FIG. 13).

Figure 17:
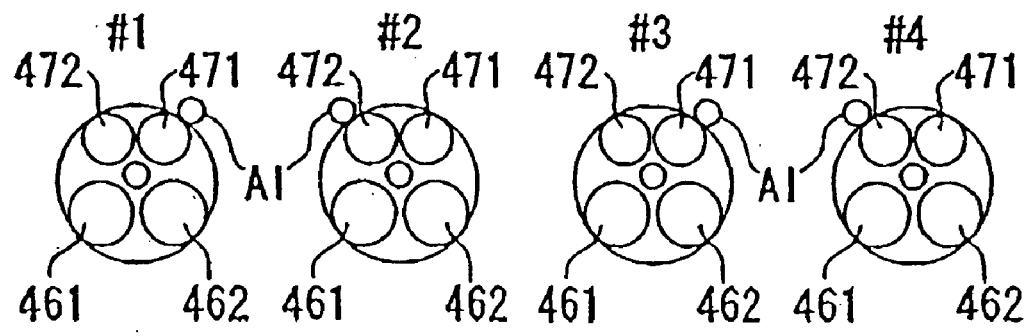
FIG. 17 is an illustration of the valve condition for the valves of each of the four cylinders in 4-valve operation.

On the other hand, when the engine speed Ne reaches or exceeds the threshold value α, 4-valve operation for a high load time is established in which each cylinder group is operated with two intake valves and two exhaust valves. First, in the condition where valve rest is not conducted in the #3 cylinder, the #4 cylinder, the #2 cylinder and the #1 cylinder, the throttle valve opening is sequentially increased according to the handgrip opening θg, and a throttle valve opening best suited to the driver's intention to accelerate is set. That is, in the condition shown in FIG. 17, the throttle valve TH is gradually opened and sequentially in the order of the #3 cylinder, the #4 cylinder, the #2 cylinder and the #1 cylinder (4-cylinder 4-valve operation shown in FIG. 13). Therefore, the throttle valve openings in the #3 cylinder and the #4 cylinder, in the #2 cylinder, and in the #1 cylinder are different, except for the fully opened time and the fully closed time of the throttle valve TH.

Therefore, according to the above-described embodiment, the throttle valve openings in the #3 cylinder and the #4 cylinder, in the #2 cylinder, and in the #1 cylinder are different, except for the fully opened time and the fully closed time of the throttle valve TH, and the throttle valve TH in the next cylinder group is opened before the throttle valve opening in the former cylinder group reaches the fully opened state. Therefore, as compared to the case where the throttle valves in all cylinder groups are simultaneously opened to thereby increase the output, the engine E can be operated with high combustion efficiency, which can contribute to improvement of fuel consumption. Among others, since the throttle valve in the next cylinder group is opened before the throttle valve opening in the former cylinder group reaches the fully opened state, it is possible to eliminate the step in output, and to realize a smooth operation.

In addition, in this embodiment, the average of the increase ratio (dTH/dθg) of the throttle valve opening to the handgrip opening in the #3 cylinder and the #4 cylinder whose throttle valves are opened first is set higher than the average of the increase ratio of the throttle valve opening to the handgrip opening in the #2 cylinder whose throttle opening is next started to open. Further, the average of the increase ratio of the throttle valve opening to the handgrip opening in the #2 cylinder is set higher than that in the #1 cylinder whose throttle valve is next started to open. In other words, the increase ratio in a cylinder whose throttle valve is opened first at the time of starting the grip operation is set to be high, and the increase ratios in the cylinders whose throttle valves are thereafter opened sequentially are set to be gradually lowered. Referring to FIG. 13, the inclinations of the three lines are so set that the inclination is greater as the line is located on the more left side.

Therefore, since the increase ratio is high in a low load range, by bringing the throttle valve opening to the fully opened state earlier, it is possible to operate in the range with a higher load factor, and to reduce the pumping loss, so that an improvement in fuel consumption can be obtained.

In addition, by limiting the intake air amount at a low load time, it is possible to enhance the flow rate of the intake air, and to enhance the combustion efficiency. Additionally, by resting a specified valve or valves, it is possible to generate an intake air swirl. As a result, the fuel consumption can be further improved.

Figure 18:
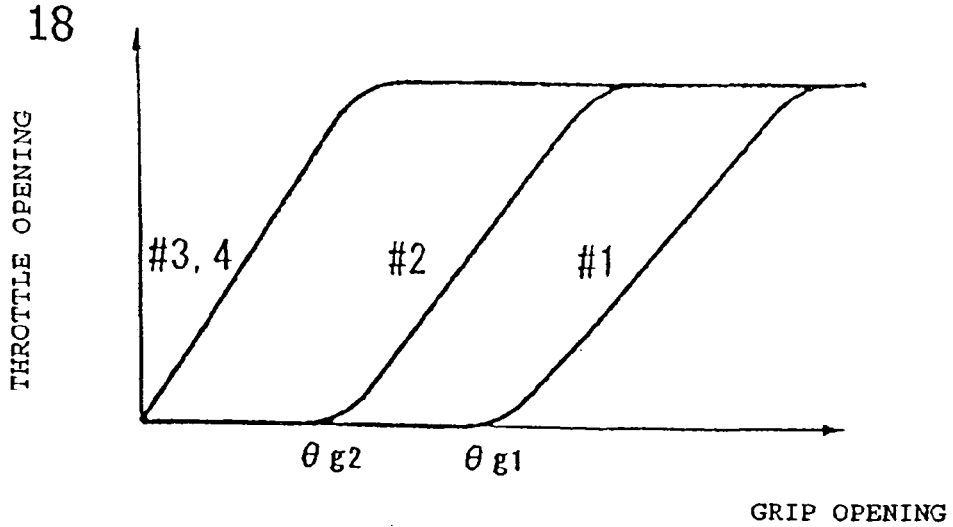
FIG. 18 is a graph diagram showing the relationship between grip opening and throttle valve opening in a second embodiment.

FIG. 18 shows a second embodiment of the present invention, in which the throttle valve opening in relation to the grip opening is different in the #3 cylinder and the #4 cylinder, in the #2 cylinder, and in the #1 cylinder, from the respective relations shown in FIG. 13. Namely, the throttle valve openings set for the #3 cylinder and the #4 cylinder, for the #2 cylinder, and for the #1 cylinder are set so that the increase factor is gradually enlarged according to the grip opening θg in the vicinity of the full closure of the throttle valve and that the increase factor is gradually reduced according to the grip opening θg in the vicinity of the full opening of the throttle valve. Specifically, in FIG. 18, the throttle valve openings in the #3 cylinder and the #4 cylinder, in the #2 cylinder, and in the #1 cylinder are set so that the increase ratio (rise-up) is gradually reduced in the vicinity of the full opening position, and the throttle valve openings in the #2 cylinder and the #1 cylinder are so set that the increase ratio (rise-up) is gradually increased in the vicinity of the full closure position.

Therefore, the increase ratio of the throttle valve opening is gradually reduced in the vicinity of the full opening of the throttle valve for the #3 cylinder and the #4 cylinder. Moreover, the increase ratio of the throttle valve opening is enlarged at the start of opening of the throttle valve for the #2 cylinder. By this means, the process in which the throttle valve opening for the #3 cylinder and the #4 cylinder is gradually brought to the fully opened state is compensated for by the rise-up (increased slope) at the start of opening of the throttle valve for the #2 cylinder. Therefore, it is possible to reduce the engine output variation at the time of starting the operation of the #2 cylinder, to obtain an enhanced sense of power, and to enhance drivability.

Additionally, similarly, the increase ratio of the throttle valve opening is gradually reduced in the vicinity of the full opening of the throttle valve for the #2 cylinder, and the increase ratio of the throttle valve opening is enlarged at the start of opening of the throttle valve for the #1 cylinder. By this means, the process in which the throttle valve opening of the #2 cylinder is gradually brought to the fully opened state is compensated for by the rise-up (increased slope) at the start of opening of the throttle valve of the #1 cylinder. Therefore, it is possible to reduce the engine output variation at the time of starting the operation of the #1 cylinder, to obtain an enhanced sense of power, and to enhance drivability.

Figure 19:
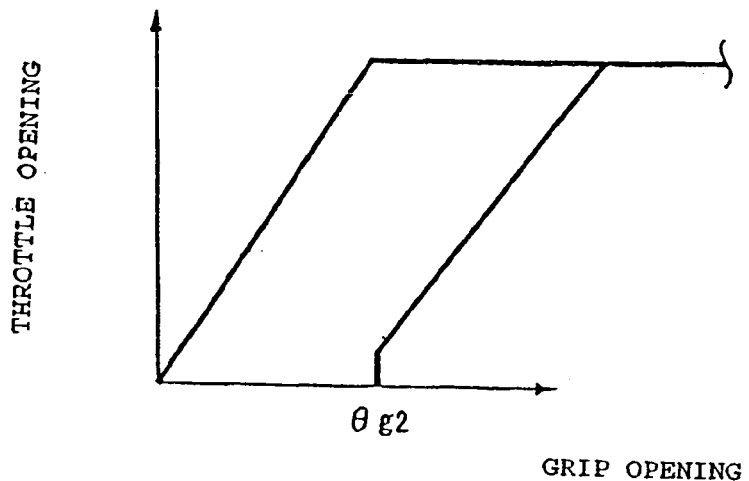
FIG. 19 is a graph diagram showing partly the relationship between grip opening and throttle valve opening in a third embodiment for the #3 and #4 cylinder, and for the #2 cylinder, the #1 cylinder being omitted from this figure.

FIG. 19 shows a third embodiment of the present invention, in which the openings at the start of opening of the throttle valves TH for the #2 cylinder and the #1 cylinder in the first embodiment shown in FIG. 13 are set to a predetermined opening (for example, 5°). Incidentally, FIG. 19 shows an example of the increase ratio for only the #2 cylinder, the #1 cylinder being omitted from this figure.

According to the third embodiment, it is possible to suppress the lowering in output due to the pumping loss which would be generated at the time of opening of the throttle valve TH of the #2 cylinder, being in the fully closed state during operation of the #2 cylinder. Therefore, it is possible to eliminate the drop in output when the #2 cylinder is operated, and to secure a smooth rise-up in the increase ratio. Incidentally, this embodiment is applicable also to the second embodiment.

Figure 20:
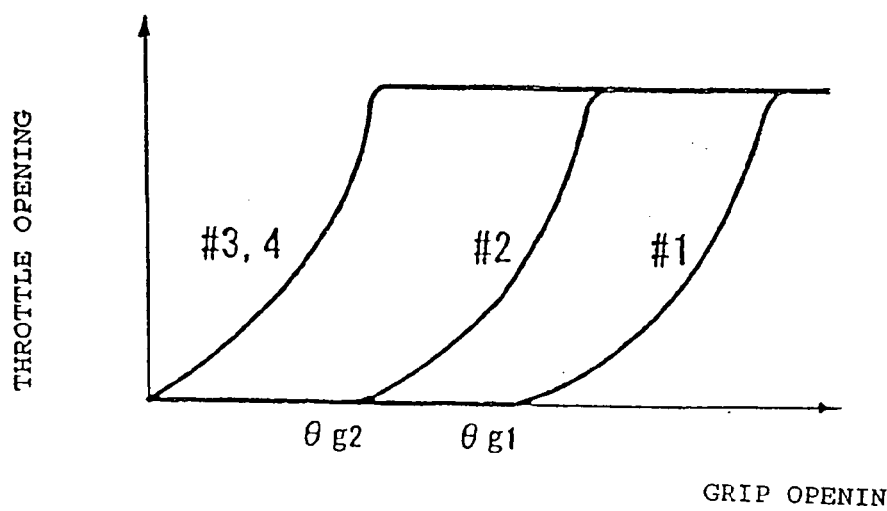
FIG. 20 is a graph diagram showing the relationship between grip opening and throttle valve opening in a fourth embodiment.
Figure 21:
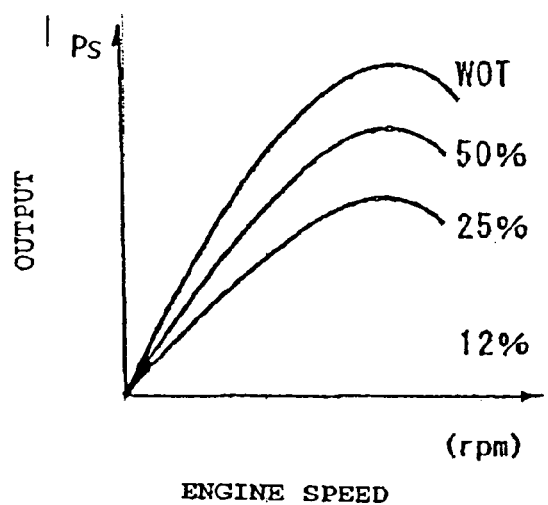
FIG. 21 is a graph diagram showing the relationship between engine speed and output.

Additionally, FIGS. 20 and 21 show a fourth embodiment of the present invention. In this embodiment, in addition to the first embodiment, the increase ratio of the throttle valve opening to the grip opening is increased from the full closure to the full opening of the throttle valve. Specifically, as shown in FIG. 20, increase ratio lines for the #3 cylinder and the #4 cylinder, for the #2 cylinder, and for the #1 cylinder are set so that the degree of slope of the lines is steeper for the latter period near the end of rise-up, that is, near a condition in which the throttle is fully open.

As shown in FIG. 21, generally, the engine output (Ps) characteristic plotted against the engine speed Ne in an arbitrary cylinder is set according to the throttle valve opening, shown here as a percent of full opening. However, the engine output (Ps) characteristic for 50 percent of full opening is near, and of the same shape, as the output characteristic for a full opening time (wholly opened time) (WOT). That is, the engine output characteristic does not change greatly, even when the throttle valve opening is 50% of the full opening time (WOT). Therefore, even if the throttle opening is reduced from that at the full opening time (WOT) to 50% thereof, the output is not lowered by a corresponding degree. Therefore, it is impossible to obtain an output characteristic which is linear in relation to the grip opening determining the throttle valve opening, i.e., in relation to the driver's intention to operate the engine. In other words, as the throttle valve is gradually opened, a certain degree of rise-up in output can be obtained in the beginning period of the opening operation, but it becomes impossible to obtain a satisfactory rise-up in output in the ending period of the opening operation.

In view of the above, in this embodiment, the rise-up in output (the increase ratio) is suppressed in the beginning period of operation when the rise-up of output is large, and the rise-up of output is set greater in the latter period near the end of the operation of the grip. Therefore, the variation in output characteristic with grip opening is linear, and drivability is enhanced. Accordingly, the output is increased, without a sense of incompatibility, according to the grip opening which shows the driver's intention to accelerate, and a pleasant operation is realized.

Figure 22:
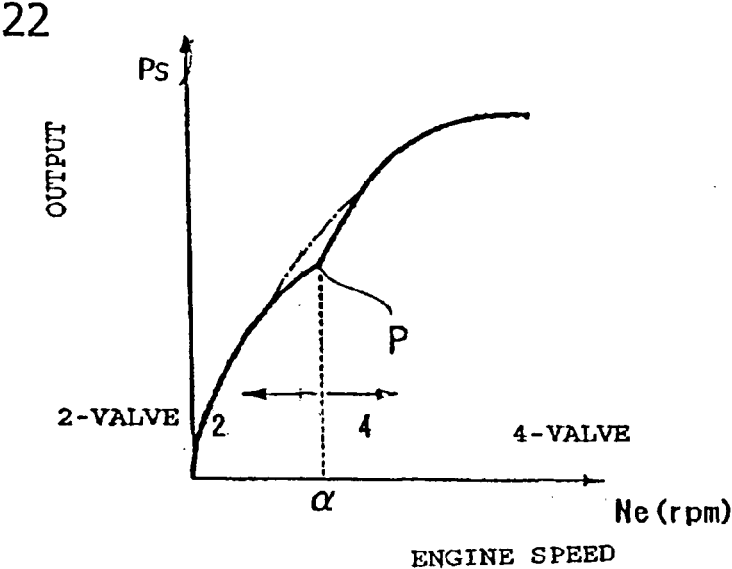
FIG. 22 is a graph diagram showing the relationship between engine speed and output in a fifth embodiment.
Figure 23:
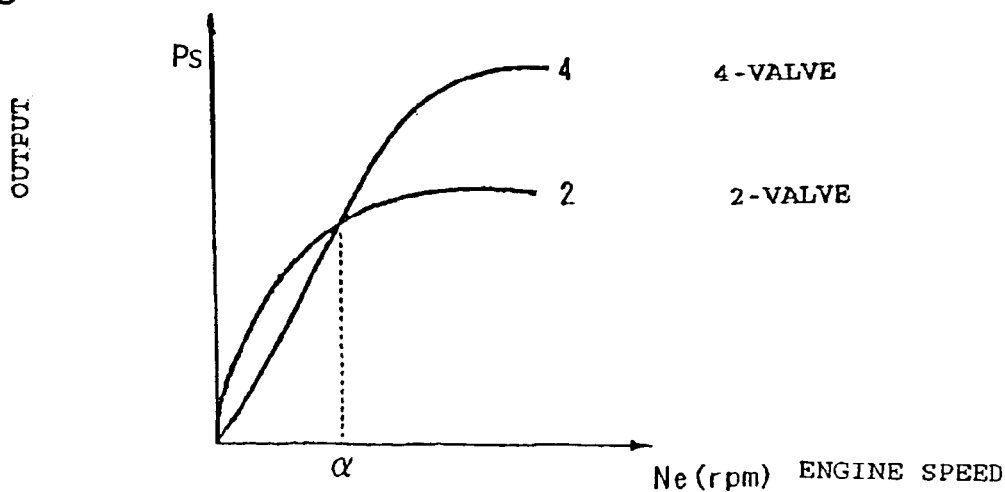
FIG. 23 is a graph diagram showing the relationships between engine speed and output in both 2-valve operation and in 4-valve operation.
Figure 24:
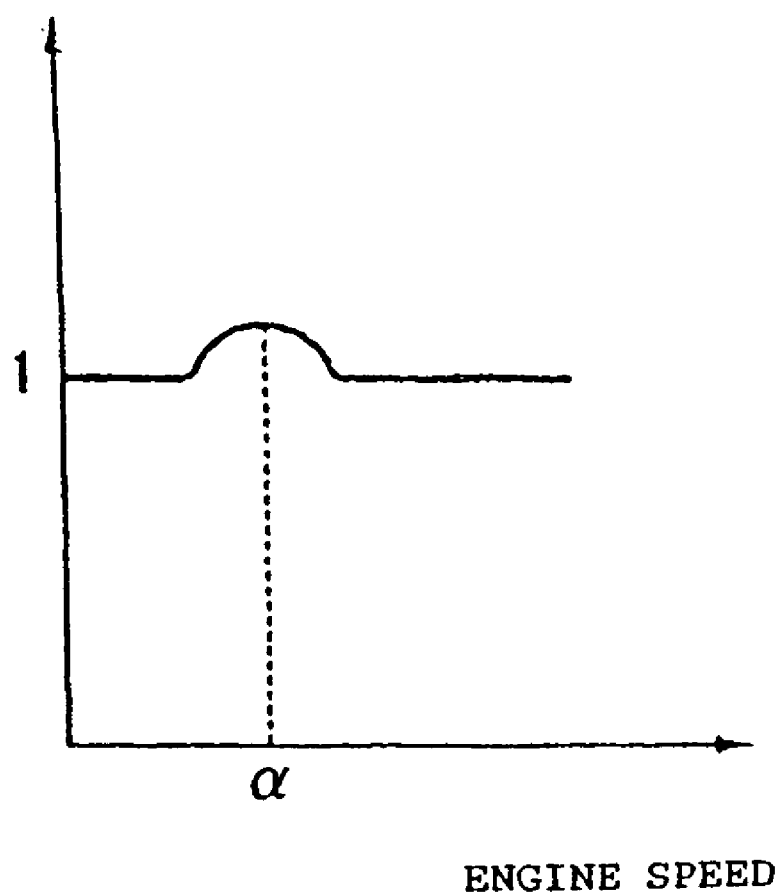
FIG. 24 is a graph diagram showing the relationship between engine speed and throttle opening correction coefficient.

In addition, FIGS. 22 to 24 show a fifth embodiment of the present invention. In this embodiment, whether the valve is to be rested or operated is determined depending on whether the engine speed Ne is higher or lower than a threshold value α. A 2-valve operation is conducted when the engine speed Ne is lower than the threshold value α, and a 4-valve operation is conducted when the engine speed Ne is not less than the threshold value α. As shown in FIG. 23, the characteristic of output Ps against engine speed Ne is different between the 2-valve operation and the 4-valve operation. When operation is switched between these two cases, as shown in FIG. 22, in the characteristic of output Ps against engine speed Ne, a discontinuity point P having a drop in output is generated at the position of the threshold value α of the engine speed Ne, which is an intersection portion of both characteristics.

In order to eliminate the discontinuity point P, the actual throttle valve opening is increased over the range from a point immediately before the threshold value α of the engine speed at the time of changeover of operation to a point immediately after the threshold value α. Specifically, while the actual throttle valve opening is determined by the following formula:

(Actual throttle valve opening)=(Basic value of throttle opening)×(Correction coefficient), the correction coefficient normally set to "1" is increased to a value in excess of "1", in the vicinity of the discontinuity point P having the above-mentioned drop, so that the value of the correction coefficient has a peak at the discontinuity point P (see FIG. 24), whereby the basic value of the throttle opening is corrected so as to obtain the required throttle opening.

This makes it possible to suppress the torque variation at the time of changeover of the number of valves, to thereby render the output characteristic linear (indicated by chain line in FIG. 22), and to enhance drivability.

The present invention is not limited to the above-described embodiments. While a description has been made taking a motorcycle as an example, the invention is applicable also to four-wheeled vehicles. In that case, the acceleration pedal opening can be used in place of the grip opening. In addition, while a description has been made taking as an example the case where the engine has four cylinders and each cylinder is provided with four valves (intake and exhaust valves), the invention is applicable also to an engine in which each cylinder is provided with one intake valve and one exhaust valve. Further, the invention is applicable to not only the 4-cylinder engine but also to a 6-cylinder engine. In a multi-cylinder engine, the combination of cylinders and the number of cylinder groups can be freely set. In a 6-cylinder engine, for example, three of the six cylinders constitute a cylinder group, two of the cylinders constitute another cylinder group, and the remaining one of the cylinders singly constitutes a cylinder group. The above-mentioned valve resting mechanism is a mere example, and a valve resting mechanism of the type in which valve rest is achieved by use of a rocker arm can be adopted. Additionally, all cylinders may be put into all valve rest. Further, while the description has been made of the case where 4-cylinder operation is established when the engine speed Ne in 2-cylinder operation has exceeded the threshold value $\alpha$, various modes can be adopted; for example, transition from 2-cylinder operation to 3-cylinder operation and further to 4-cylinder operation according to the engine speed Ne may be adopted.

While a working example of the present invention has been described above, the present invention is not limited to the working example described above, but various design alterations may be carried out without departing from the present invention as set forth in the claims. Those skilled in the art will realize that many modifications of the preferred embodiment could be made which would be operable. All such modifications, which are within the scope of the claims, are intended to be within the scope and spirit of the present invention.

What is claimed is:

1. A cylinder rest internal combustion engine comprising a plurality of cylinders,
the plurality of cylinders divided into two or more cylinder groups,
each cylinder comprising a throttle valve,
at least some of the plurality of cylinders configured to be selectively non-operative during engine operation by means of a cylinder resting mechanism,
the throttle valve of each said cylinder being independently operable on the basis of said group to which said cylinder belongs, and
the number of resting cylinders determined according to a throttle operation variable set by an operator, wherein each cylinder group comprises
a unique throttle valve opening, except when the throttle valve is fully opened or fully closed, and
a throttle valve control unit for controlling the amount of opening of said throttle valves, wherein during engine operation, the throttle valves of the groups are opened sequentially by the throttle valve control unit such that the throttle valve is opened in a next cylinder group before the throttle valve opening of a former cylinder group is brought to a fully opened state.

2. The cylinder rest internal combustion engine according to claim 1, wherein said plurality of cylinders include normally operative cylinders and rest-able cylinders, and the amount of opening at the start of opening of said throttle valve in said rest-able cylinder is set to a predetermined opening.

3. The cylinder rest internal combustion engine according to claim 1, wherein the throttle valve opening set for each said cylinder group is set so that an increase ratio, defined as the ratio of the amount of throttle valve opening to the change in the throttle operation variable, is gradually increased according to said throttle operation variable in the vicinity of the full closure of said throttle valve, and
the increase ratio is gradually reduced according to said throttle operation variable in the vicinity of the full opening of said throttle valve.

4. The cylinder rest internal combustion engine according to claim 1, wherein the average of the increase ratio of the throttle valve opening to said throttle operation variable in each said cylinder group is set higher for the cylinder group whose throttle valve is opened first upon the start of throttle operation, and said average is set to be gradually lower for the cylinder groups whose throttle valves are sequentially opened thereafter.

5. The cylinder rest internal combustion engine according to claim 1, wherein a variable valve number control mechanism is provided for each said cylinder, and specified valves are rested at a low load time.

6. The cylinder rest internal combustion engine according to claim 5, wherein changing over the number of operative valves is set to occur at a predetermined engine speed, and in the case of changing over the number of operative valves by said variable valve number control mechanism, the throttle valve opening is increased before the engine speed reaches the predetermined engine speed.

7. The cylinder rest internal combustion engine according to claim 1, wherein the increase ratio of said throttle valve opening to said throttle operation variable is increased from the full closure of said throttle valve to the fully opening of said throttle valve.

8. A method of using a cylinder rest internal combustion engine, the engine comprising
a control unit,
a plurality of cylinders,
the plurality of cylinders divided into two or more groups,
each cylinder comprising a throttle valve,
at least some of the plurality of cylinders configured to be selectively non-operative during engine operation by means of the cylinder resting mechanism,
the respective throttle valves of selected cylinders being independently operable on the basis of said group to which said cylinder belongs,
the method of using the cylinder rest internal combustion engine comprising
monitoring the throttle opening and a throttle operation variable,
setting the number of resting cylinders according to the throttle operation variable,
opening the throttle valves of the groups sequentially by the control unit such that the throttle valve is opened in a next cylinder group before the throttle valve opening of a former cylinder group is brought to a fully opened state.

9. The method of using a cylinder rest internal combustion engine of claim 8, wherein the step of opening the throttle valves further comprises the throttle valve opening being set for each said cylinder group is set so that an increase ratio, defined as the ratio of the amount of throttle valve opening to the change in the throttle operation variable, is gradually increased according to said throttle operation variable in the vicinity of the full closure of said throttle valve, and the increase ratio is gradually reduced according to said throttle operation variable in the vicinity of the full opening of said throttle valve.

10. The method of using a cylinder rest internal combustion engine of claim 8, wherein the method step of opening the throttle valves further comprises setting an average of the increase ratio of the throttle valve opening to said throttle operation variable in each said cylinder group to be higher for the cylinder group whose throttle valve is opened first upon the start of throttle operation, and setting said average to be gradually lower for the cylinder groups whose throttle valves are sequentially opened thereafter.

11. The method of using a cylinder rest internal combustion engine of claim 8, wherein said plurality of cylinders include normally operative cylinders and rest-able cylinders, and wherein the method step of opening the throttle valves further comprises setting the amount of opening at the start of opening of said throttle valve in said rest-able cylinder to a predetermined opening.

* * * * *